(12) United States Patent
Tokuda et al.

(10) Patent No.: US 11,343,215 B2
(45) Date of Patent: May 24, 2022

(54) USER INTERFACE FOR EMAIL INBOX TO CALL ATTENTION DIFFERENTLY TO DIFFERENT CLASSES OF EMAIL

(71) Applicant: Iconix, Inc., San Jose, CA (US)

(72) Inventors: Lance Aiji Tokuda, Foster City, CA (US); Robert Philip Zager, Saratoga, CA (US); Jia Shen, E. Palo Alto, CA (US); Jose Jesus Picazo, Jr., Livermore, CA (US); Bryan Allen Talbot, San Carlos, CA (US)

(73) Assignee: Iconix, Inc., Mountain View, CA (US)

( * ) Notice: Subject to any disclaimer, the term of this patent is extended or adjusted under 35 U.S.C. 154(b) by 0 days.

(21) Appl. No.: 16/791,641

(22) Filed: Feb. 14, 2020

(65) Prior Publication Data
US 2020/0396196 A1    Dec. 17, 2020

Related U.S. Application Data

(63) Continuation of application No. 14/824,214, filed on Aug. 12, 2015, now Pat. No. 10,594,645, which is a
(Continued)

(51) Int. Cl.
*H04L 12/58* (2006.01)
*H04L 51/224* (2022.01)
(Continued)

(52) U.S. Cl.
CPC .......... *H04L 51/24* (2013.01); *G06F 3/04842* (2013.01); *G06F 3/04847* (2013.01); *H04L 51/14* (2013.01); *H04L 51/12* (2013.01)

(58) Field of Classification Search
CPC ............ G06F 9/44526; H04N 1/00965; H04L 41/026; H04L 51/14; H04L 12/5855
See application file for complete search history.

(56) References Cited

U.S. PATENT DOCUMENTS 5,907,619 A * 5/1999 Davis .................... H04L 9/3247
713/176
6,018,761 A     1/2000 Uomini
(Continued)

OTHER PUBLICATIONS

"U.S. Appl. No. 11/072,608, Preliminary Amendment filed Mar. 8, 2006", 22 pgs.
(Continued)

*Primary Examiner* — Esther B. Henderson
(74) *Attorney, Agent, or Firm* — Schwegman Lundberg & Woessner, P.A.

(57) ABSTRACT

A user interface for email users which calls attention to one or more categories of emails in different ways. In some species, at least three categories are used: branded senders with Truemarks; white list buddies; and fraudulent emails which are either not from the domain they purport to be from or in which the content was tampered. The preferred embodiment authenticates emails from branded senders and displays them with the sender's Truemark. Branded sender emails have their Truemarks displayed in the sender column of a list view in the preferred embodiment. In a preferred embodiment, white list senders have either an icon or other graphic or photo they choose displayed to the left or right of the sender column with their name in the sender column. In a preferred embodiment, fraudulent emails have a fraud icon displayed to the left or right of the sender column with a warning in the sender column. Antiphishing processing is also disclosed.

19 Claims, 22 Drawing Sheets

Related U.S. Application Data continuation of application No. 11/374,696, filed on Mar. 13, 2006, now Pat. No. 9,137,048, which is a continuation of application No. 11/072,608, filed on Mar. 3, 2005, now abandoned.

(51) Int. Cl.
*H04L 51/00* (2022.01)
*G06F 3/04842* (2022.01)
*G06F 3/04847* (2022.01)

(56) References Cited

U.S. PATENT DOCUMENTS

| | | | |
|---|---|---|---|
| 6,195,091 B1* | 2/2001 | Harple | G06Q 10/10 348/E7.084 |
| 6,317,761 B1* | 11/2001 | Landsman | G06Q 30/0262 715/205 |
| 6,356,935 B1 | 3/2002 | Gibbs | |
| 6,650,890 B1* | 11/2003 | Irlam | G06Q 10/107 455/412.1 |
| 6,779,178 B1 | 8/2004 | Lloyd et al. | |
| 6,996,606 B2 | 2/2006 | Hasegawa | |
| 7,171,614 B2* | 1/2007 | Allor | G06F 16/958 715/205 |
| 7,275,086 B1* | 9/2007 | Bodnar | G06F 9/542 709/218 |
| 7,457,955 B2* | 11/2008 | Seshadri | H04L 9/3236 713/170 |
| 7,487,213 B2* | 2/2009 | Zager | G06Q 10/107 709/206 |
| 8,621,217 B2* | 12/2013 | Seshadri | G06Q 10/107 713/170 |
| 9,137,048 B2 | 9/2015 | Tokuda et al. | |
| 10,594,645 B2 | 3/2020 | Tokuda et al. | |
| 2002/0032743 A1 | 3/2002 | Lee et al. | |
| 2002/0165954 A1* | 11/2002 | Eshghi | H04L 67/22 709/224 |
| 2003/0233482 A1* | 12/2003 | Skrepetos | G06F 16/957 709/250 |
| 2004/0015726 A1* | 1/2004 | Szor | H04L 51/12 726/24 |
| 2004/0205135 A1 | 10/2004 | Hallam-Baker et al. | |
| 2005/0039017 A1* | 2/2005 | Delany | H04L 61/1511 713/176 |
| 2005/0050145 A1* | 3/2005 | Lowe | H04L 67/36 709/206 |
| 2005/0050150 A1* | 3/2005 | Dinkin | H04L 51/12 709/207 |
| 2005/0165680 A1* | 7/2005 | Keeling | G06Q 20/14 705/40 |
| 2005/0182938 A1* | 8/2005 | Seshadri | H04L 63/0428 713/176 |
| 2005/0188020 A1* | 8/2005 | Avritch | H04L 51/00 709/206 |
| 2005/0216550 A1 | 9/2005 | Paseman et al. | |
| 2005/0216563 A1* | 9/2005 | Stewart | H04L 51/043 709/206 |
| 2005/0223074 A1* | 10/2005 | Morris | H04L 51/12 709/207 |
| 2005/0257261 A1 | 11/2005 | Shraim et al. | |
| 2005/0262209 A1 | 11/2005 | Yu | |
| 2006/0053198 A1* | 3/2006 | Pricken | G06Q 10/107 709/206 |
| 2006/0075027 A1 | 4/2006 | Zager et al. | |
| 2006/0075028 A1 | 4/2006 | Zager et al. | |
| 2006/0075030 A1 | 4/2006 | van Riel | |
| 2006/0200530 A1* | 9/2006 | Tokuda | G06F 3/04842 709/206 |
| 2006/0200531 A1 | 9/2006 | Tokuda et al. | |
| 2008/0228650 A1* | 9/2008 | Cochran | G06Q 20/12 705/59 |
| 2015/0365369 A1 | 12/2015 | Tokuda et al. | |

OTHER PUBLICATIONS

"U.S. Appl. No. 11/072,608, Non-Final Office Action dated Nov. 13, 2008", 21 pgs.
"U.S. Appl. No. 11/374,696, Non-Final Office Action dated Dec. 12, 2008", 16 pgs.
"U.S. Appl. No. 11/375,329, Non-Final Office Action dated Dec. 30, 2008", 9 pgs.
"U.S. Appl. No. 11/072,608, Response filed Feb. 13, 2009 to Non-Final Office Action dated Nov. 13, 2008", 16 pgs.
"U.S. Appl. No. 11/072,791, Non-Final Office Action dated Mar. 4, 2009", 12 pgs.
"U.S. Appl. No. 11/374,696, Response filed Mar. 12, 2009 to Non-Final Office Action dated Dec. 12, 2008", 8 pgs.
"U.S. Appl. No. 11/072,608, Final Office Action dated May 18, 2009", 31 pgs.
"U.S. Appl. No. 11/374,696, Final Office Action dated Jun. 17, 2009", 19 pgs.
"U.S. Appl. No. 11/072,608, Response filed Sep. 22, 2008 to Restriction Requirement dated Aug. 20, 2008", 13 pgs.
"U.S. Appl. No. 11/072,608, Restriction Requirement dated Aug. 20, 2008", 11 pgs.
"International Application Serial No. PCT US2006 007573, International Preliminary Report on Patentability dated Sep. 20, 2007", 5 pgs.
"U.S. Appl. No. 11/072,791, Response filed Aug. 28, 2009 to Non Final Office Action dated Mar. 4, 2009", 17 pgs.
"U.S. Appl. No. 11/072,608, Response filed Nov. 18, 2009 to Final Office Action dated May 18, 2009", 16 pgs.
"U.S. Appl. No. 11/072,791, Final Office Action dated Dec. 15, 2009", 10 pgs.
"U.S. Appl. No. 11/374,696, Response filed Dec. 17, 2009 to Final Office Action dated Jun. 17, 2009", 7 pgs.
"U.S. Appl. No. 11/072,608, Non-Final Office Action dated Dec. 28, 2009", 32 Pgs.
"U.S. Appl. No. 11/072,791, Response filed Jun. 10, 2010 to Final Office Action dated Dec. 15, 2009", 16 pgs.
"U.S. Appl. No. 11/072,608, Response filed Jun. 28, 2010 to Non Final Office Action dated Dec. 28, 2009", 18 pgs.
"U.S. Appl. No. 11/072,608 Final Office Action dated Sep. 16, 2010", 19 pgs.
"U.S. Appl. No. 11/072,791, Non-Final Office Action dated Oct. 18, 2010", 10 pgs.
"U.S. Appl. No. 11/374,696, Non Final Office Action dated Dec. 22, 2010", 13 pgs.
"U.S. Appl. No. 11/072,791, Response filed Mar. 7, 2011 to Non-Final Office Action dated Oct. 18, 2010", 11 pgs.
"U.S. Appl. No. 11/374,696, Response filed Jun. 22, 2011 to Non-Final Office Action dated Dec. 22, 2010", 9 pgs.
"U.S. Appl. No. 11/374,696, Final Office Action dated Sep. 6, 2011", 14 pgs.
"U.S. Appl. No. 11/374,696, Response filed Mar. 6, 2012 to Final Office Action dated Sep. 6, 2011", 9 pgs.
"U.S. Appl. No. 11/374,696, Non Final Office Action dated May 23, 2013", 18 pgs.
"U.S. Appl. No. 11/374,696, Response filed Nov. 25, 2013 to Non Final Office Action dated May 23, 2013", 10 pgs.
"U.S. Appl. No. 11/374,696, Final Office Action dated Feb. 28, 2014", 19 pgs.
"U.S. Appl. No. 11/374,696, Response filed Aug. 28, 2014 to Final Office Action dated Feb. 28, 2014", 10 pgs.
"U.S. Appl. No. 11/374,696, Non Final Office Action dated Sep. 26, 2014", 18 pgs.
"U.S. Appl. No. 11/374,696, Response filed Mar. 26, 2015 to Non Final Office Action dated Sep. 26, 2014", 10 pgs.
"U.S. Appl. No. 11/374,696, Notice of Allowance dated Jul. 7, 2015", 8 pgs.
"U.S. Appl. No. 14/824,214 Preliminary Amendment filed Aug. 31, 2015", 7 pgs.
"U.S. Appl. No. 14/824,214, Non Final Office Action dated Apr. 18, 2018", 9 pgs.
"U.S. Appl. No. 14/824,214, Response filed Aug. 20, 2018 to Non Final Office Action dated Apr. 18, 2018", 8 pgs.

(56) References Cited

OTHER PUBLICATIONS

"U.S. Appl. No. 14/824,214, Final Office Action dated Dec. 17, 2018", 14 pgs.
"U.S. Appl. No. 14/824,214, Respnse filed Feb. 19, 2019 to Final Office Action dated Dec. 17, 2018", 9 pgs.
"U.S. Appl. No. 14/824,214, Advisory Action dated Mar. 5, 2019", 2 pgs.
"U.S. Appl. No. 14/824,214, Non Final Office Action dated May 10, 2019", 12 pgs.
"U.S. Appl. No. 14/824,214, Response filed Aug. 12, 2019 to Non-Final Office Action dated May 10, 2019", 6 pgs.
"U.S. Appl. No. 14/824,214, Notice of Allowance dated Nov. 6, 2019", 5 pgs.

\* cited by examiner

FIG. 2

Folders [Add - Edit]
- Inbox (56)
- Draft
- Sent [Empty]
- Bulk [Empty]
- Trash [Empty]

US Avg. Credit Score - 678, what's yours?
Get unlimited calls to U.S./Canada
Bad Credit? Refinance 2.9%
No Credit? Get a MasterCard

Inbox
View: All Messages ▼

1% of 250.0MB
Messages 1-25 of 69 First | Previous | Next | Last

[Delete] [Spam] [Mark ▼] [Move... ▼]

| | Sender | Subject | Date | Size |
|---|---|---|---|---|
| 10 | | 28 | Date | Size |
| 12 → | citibank | Your December 2004 Bank Statement | Tue 01/11 | 21k |
| 14 → | Yahoo! HotJobs | Search Results for solutions from HotJobs | Sat 01/08 | 20k |
| 16 → | Yahoo! HotJobs | Search Results for solutions from HotJobs | Tue 01/04 | 20k |
| 17 → | Yahoo! HotJobs | Search Results for solutions from HotJobs | Sat 01/01 | 21k |
| 18 → | Yahoo! HotJobs | Search Results for solutions from HotJobs | Thu 12/30 | 20k |
| 19 → | GenericBank | ankle pickle | Thu 12/30 | 2k |
| 20 → | Yahoo! HotJobs | Search Results for solutions from HotJobs | Thu 12/30 | 2k |
| 30 → | Jenny S | Wahoo Blogs | Thu 12/30 | 2k |
| 32 → | Mekatek | woallhy koala | Thu 12/30 | 2k |
| 150 → | MekaTrust | [ptr] test my bacon | Thu 12/30 | 2k |
| 34 → | Tanya | [ptr] test me wear | Thu 12/30 | 2k |
| | Meketek | [abc] super meka test | Thu 12/30 | 2k |
| 21 → | Yahoo! HotJobs | Search Results for solutions from HotJobs | Tue 12/28 | 20k |
| 22 → | | Free Oil Changes | Mon 12/27 | 20k |
| 36 → | Yahoo! HotJobs | Search Results for solutions from HotJobs | Sat 12/25 | 21k |
| 23 → | Buddy G | Hey Bud | Thu 12/23 | 21k |
| 38 → | Yahoo! HotJobs | Search Results for solutions from HotJobs | Thu 12/23 | 20k |
| 40 → | Tyrese D | Get to getha | Tue 12/21 | 24k |
| 24 → | Wylert Wang | Doboy Concert | Sun 12/19 | 20k |
| 25 → | Yahoo! HotJobs | Search Results for solutions from HotJobs | Fri 12/17 | 22k |
| 26 → | Yahoo! HotJobs | Search Results for solutions from HotJobs | Thu 12/16 | 20k |
| 27 → | Mrs. Fields | Your Cookie Order has been Shipped! | Wed 12/15 | 22k |
| | Yahoo! HotJobs | Search Results for solutions from HotJobs | Tue 12/14 | 22k |
| 42 → | Phishing | ~~Pretending to be somebody else~~ | Sun 12/12 | 20k |
| | Yahoo! HotJobs | Search Results for solutions from HotJobs | Sat 12/11 | 20k |

Check All - Clear All

Messages 1-25 of 69 First | Previous | Next | Last

VALUE-ADDED PROCESS

FIG. 11

| SENDER TYPE | AUTH. RESULT: | PASS | FAIL | NO DATA |
|---|---|---|---|---|
| TRUEMARK CUSTOMER (FUAP = TRUE) | | TRUEMARK ICON | FRAUD ICON | FRAUD ICON |
| TRUEMARK CUSTOMER (FUAP = FALSE) | | TRUEMARK ICON | NOTHING | NOTHING |
| WHITE LIST BUDDY | | BUDDY ICON OR GENERIC WHITE LIST ICON | BUDDY ICON OR GENERIC WHITE LIST ICON | BUDDY ICON OR GENERIC WHITE LIST ICON |
| NON BUDDY MEMBER | | GENERIC NON BUDDY ICON | GENERIC NON BUDDY ICON | GENERIC NON BUDDY ICON |
| NON MEMBER | | NOTHING | NOTHING | NOTHING |

200 → TRUEMARK CUSTOMER (FUAP = TRUE)
202 → TRUEMARK CUSTOMER (FUAP = FALSE)
204 → WHITE LIST BUDDY
206 → NON BUDDY MEMBER
208 → NON MEMBER

FIG. 16

USER INTERFACE FOR EMAIL INBOX TO CALL ATTENTION DIFFERENTLY TO DIFFERENT CLASSES OF EMAIL

CLAIM OF PRIORITY

This application is a continuation of U.S. application Ser. No. 14/824,214 filed Aug. 12, 2015, which is a continuation of U.S. application Ser. No. 11/374,696, filed Mar. 13, 2006, which is a continuation of U.S. application Ser. No. 11/072, 608 filed Mar. 3, 2005, all of which are incorporated herein by reference.

BACKGROUND OF THE INVENTION

With the increasing use of email for communication between friends and between companies and their prospective and existing customers, certain problems have arisen. First and foremost is the problem of too much email especially from companies and other senders from whom the recipient does not particularly want to receive email. Because the volume of email is growing, recipients tend to become oblivious to email and ignore it except if it is from a friend or a client or somebody the recipient knows and wants to hear from. As a result, recipients of unwanted email may delete important marketing or recall or other messages from companies that arrive along with many other unwanted messages.

Companies need a way to draw attention to their email so as to segregate it from other email thereby providing a better chance that their emails will be received and read by users who are bombarded with unwanted emails from many senders.

Companies also want a way to reassure users that when a user receives an email from the company, that the email is authentic and from that company and not somebody trying to pass themselves off as that company as a "phisher". Phishing is a new development in the email world and involves unscrupulous individuals conning email users and browser users into believing they are communicating with an entity they want to communicate with when they are actually communicating with somebody they do not want to communicate with. This can severely damage the reputation of a company, so any methodology by which legitimate companies can protect their customers from phishers and communicate this fact to their customers and email recipients would be welcome addition to the marketing efforts of these companies.

Email recipients are especially interested in emails from their friends, clients, business associates and other persons with whom they want to communicate. It is important to these users that such emails be brought to their attention so as to stand out in their inboxes from all the other emails they receive.

Finally, email recipients have an interest in protecting themselves from phishing attacks. It is useful to email recipients to have emails that have been confirmed to be fraudulent brought to their attention such that they stand out in the user's inbox from all the other user's emails.

A recent example involving Microsoft highlights the gravity of this problem. This story was published in the Feb. 14, 2005 issue of Newsweek at page 12. An MSN user received an email indicating there was something wrong with her account and she was directed to go a URL provided in the email and re-enter her credit card number. At that URL, an official looking web page purporting to be hosted by Microsoft Network appeared, but it was a fake. The user was suspicious and referred the email to her son-in-law who worked for Microsoft. Microsoft launched an investigation to find out who was behind the fake website. Microsoft has a former U.S. Marshal as its lead cyberferret. Beginning in October 2003, Microsoft started an investigation filing suit against numerous John Does so it could use subpoena power in it attempt to untangle the convoluted trail of the email and the phony web page. The email path dead ended at an ISP in India, so the investigation turned its focus to the owner of the fake web page. Every web page has a URL which is traceable to the service that hosts it. But these URLs can lead to other addresses assigned by other ISPs or co-location services. With each round, a subpoena had to be served on the hosting ISP to find out who was paying for the service. The first round led to a company in San Francisco. The second round led to another hosting service in San Francisco. Round three led to a free "re-direction service" in Austria. There the trail would have ended because the subpoena power of the U.S. courts does not extend beyond U.S. borders. However, luckily, the Austrian owner of the re-direction service hates phishers, and voluntarily provided the information. This information led to yet another internet address owned by Quest. A subpoena of Quest led to Microsoft itself: an address assigned to a Microsoft user who was a 69 year old man living in Davenport, Iowa. The man had a 21 year old grandson, Harris, who lived in his house and was a computer geek but who worked for Blockbuster. Microsoft then went to the FBI which searched the house in 2004 and seized Harris' three computers. Microsoft then sued Harris who did not respond. Microsoft obtained a three million dollar default judgment. Good luck collecting on that. The real damage to Microsoft was in the possible losses to its customers from successful phishing attacks and the large amount of money and time consumed in the investigation.

Therefore, a need has arisen for a user interface and method of operating a computer to provide a protected email space where customers of the service can send emails and have their recipients free of fear that the emails are from phishers and wherein the emails are set apart from other emails in some distinctive way. Preferably, the needed system will provide an email inbox which brings to the attention of the user in different ways emails which are known to be from particular companies, emails which are from friends, clients, etc. on a user's white list and emails which are known to be fraudulent.

SUMMARY OF THE INVENTION

The teachings of the technology claimed herein contemplate a user interface for displaying a list view of emails and calling attention in any way to certain emails in the list view which are in certain categories. The claims call for apparatus and processes and computer readable medium carrying instructions which control a computer to create user interface displays which call attention to the one or more categories of emails differently. In the preferred embodiment, four different categories of email exist, each of which is called attention to differently. In other alternative embodiments, single categories of email are called attention to set them apart from all other emails. For example, branded emails from subscribers who have passed a due diligence inquiry and proven that they have a registered trademark will have their emails set apart from all other emails by a display of their corporate logo or trademark in the sender column of a list view of emails viewed using a web browser or email client.

BRIEF DESCRIPTION OF THE DRAWINGS

FIG. 2 is a screen shot of an email client inbox which is displayed when the computer is being operated in accordance with the teachings of one embodiment.

FIG. 11 is a screenshot of the preferred form of user interface display that occurs when an event called the branded mouseover occurs in some embodiments.

FIG. 16 is a table that shows one embodiment of what is displayed for each different authentication result for each different category in embodiments where there are five categories: Truemark customer with FUAP set to true; Truemark customer with FUAP set to false; white list buddy; non member buddy; and non member.

DETAILED DESCRIPTION OF THE PREFERRED AND ALTERNATIVE EMBODIMENTS

Figure 1:
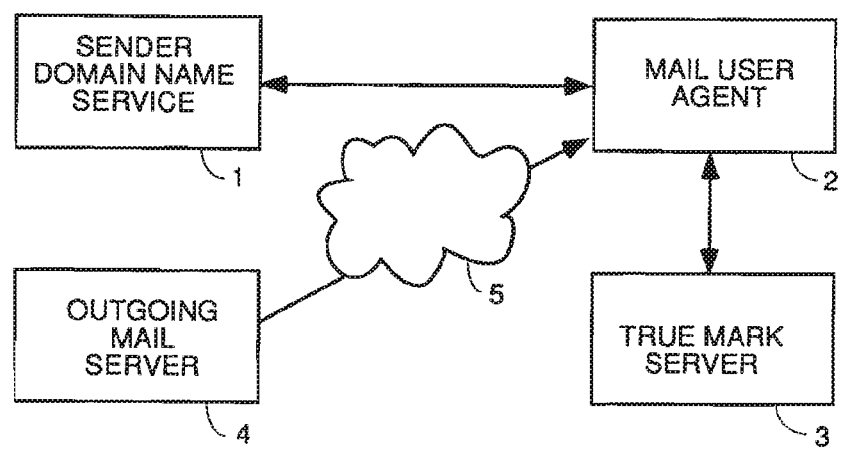
FIG. 1 is a diagram of the hardware and software environment in which a Truemark based embodiment is practiced.

One important aspect of at least some embodiments of the invention contemplates any process implemented with any hardware and any software to increase the trust of email communications. The genus of processes for increasing the trust of email communications comprises the following steps:

verifying an association between a sender and certain trademarks, service marks, copyrighted data, sounds, smells, jingles, and/or licensed data and/or any other humanly perceptible computer behavior hereafter known as Truemarks;

receiving an email from said sender, wherein said receiver's domain name may or may not be the same as sender's domain name;

checking said received email for authentication and/or integrity;

using a mail user agent to control a device capable of displaying email to display at least some information about said received email and use a Truemark somewhere in the display of information about said authenticated and integrity checked email to call attention to said email.

Any species that performs at least these four steps will increase the trust of email and is within this particular genus of processes. An important part of this genus of processes is verifying that an email came from the entity which it purports to be from (referred to herein as authentication) and an integrity check. This authentication and integrity checking can be done anywhere on the receiving side of the email transaction. For example, it can be done at an incoming mail transfer agent, an incoming web mail server, by an email thick client process. Either sender authentication or domain authentication will suffice. Sender authentication means that the email is in fact from the sender who it purports to be from. Domain authentication means that verification that the email came from the domain it purports to be from has occurred. An integrity check means that the email has been checked to ensure that it has not been altered.

A mail user agent is any combination of hardware and software that controls a device for displaying emails so as to call attention to one or more categories of emails using any humanly perceptible means. A mail user agent can be one or more software processes running on a server, a client computer, a cell phone, any wireless device that can retrieve or display emails, and it can call attention to any one or more categories of emails in any one or more of the ways described herein or using any other humanly perceptible mechanism not described herein.

Step one of this genus of processes involves verification the association between the sender and the Truemark. This is a manual process in the form of a due diligence investigation. The preferred method of carrying out this process is as follows. All corporate logo or branded senders must go through a manual due diligence process of verification before they are allowed to have their registered trademarks displayed as Truemarks with their emails. Generally, in this process, a representative of the assignee visits the branded sender and verifies the company is who it says it is, and that the company has the exclusive right to use the proposed Truemark, as proven by a registration of the Truemark at the United States Patent and Trademark Office. The branded sender will also have to prove that the person requesting the branded sender status and access to the protected email space is authorized by the company to make such a request. Foreign branded senders must, in the preferred embodiment, register their proposed Truemarks at the United States Patent and Trademark Office to achieve branded sender status. In alternative embodiments, the requirement for registration of a mark can be relaxed.

In some embodiments, branded senders may have as their Truemarks unregistered corporate logos or other images or designs displayed in the sender column and the requirement for registration as a trademark may be relaxed.

If everything checks out properly in this due diligence process, the Truemark will be authorized and the corporate client will be allowed to upload their Truemark to a Truemark server 3 in FIG. 1. Truemarks may be stored on a server but they could also be published.

Step 2 of the genus is to receive the email. This is a conventional process and will not be further discussed.

Step 3 of the genus is to check each received email for authentication and/or integrity. Either or both processes will suffice. Any known process for verifying the email came from the sender or domain it purports to be from and/or has not been tampered with will suffice to practice this class of embodiments. The preferred embodiment uses the Domain Keys technology defined in the Yahoo public specification to do both authentication and integrity checking.

Step 4 of the genus is to use a mail user agent to call attention to any email which passed the integrity and/or authentication checks of step 3 by displaying or otherwise presenting in some humanly perceptible form a Truemark associated with the sender along with at least some information pertaining to the email checked in step 3.

FIG. 1 is a block diagram of the preferred hardware and software environment in which the preferred species within the above described genus of processes is carried out. Sender domain name service 1 is a process running on a server which can return a public key for that domain. Mail user agent 2 is a email recipient's computer running one or more processes that call attention to emails in one or more of predetermined categories using any humanly perceptible user interface mechanism. Truemark server 3 is a server which stores Truemarks. A typical email transaction involves an outgoing mail server 4 digitally signs an email received from a sender's client computer using a sender domain's private key. The signed email is sent to the mail user agent 2 through the internet 5. The mail user agent receives the email and performs authentication and integrity checking. It does this by requesting the sender domain's public key from sender domain name service 1 and verifying the digital signature in accordance with the Domain Keys public specification published by Yahoo. If the email passes the authentication and integrity checks, a Truemark associated with the sender is retrieved from the Truemark server 3 and the mail user agent controls the recipient's computer to display at least some information about the email and displays a truemark. The preferred way of displaying a truemark is to display the Truemark in place of the sender column, as shown at 12 and 21 in FIG. 2. FIG. 2 is a screen shot of an email client inbox which is displayed when the computer is being operated in accordance one class of embodiments.

Various species within this genus: 1) display the information about the email as a summary line in an email list view; 2) replacing a column in a list view summary line representation of the received email with a Truemark; 3) adding an additional column in a list view of emails in which a Truemark is displayed for any email on the list which has passed authentication and integrity checking; 4) adding to a column in a list view of emails received a Truemark for any email which has passed authentication and integrity checking; 5) display information about the email in the form of displaying the main body and the header of the email; 6) using two or more processes to implement the mail user agent; 7) using the mail user agent to check the authentication and/or integrity of the received email; and 8) using the incoming mail server to do the authentication and/or integrity checking of the incoming email.

Genus of Buddy Icon (or Other Graphic Display) Processes

The following steps define a genus of processes which display graphics such as custom buddy icons associated with a sender along with at least some information about an email from said sender. The graphic can include photographs, icons, drawings, scanned images, etc. The genus requires that all species within it carry out the following two steps:

receiving an email from a sender whose domain can be different than the domain of the receiver;

using a mail user agent to control a device capable of displaying email to display at least some information about said received email and to display a graphic associated with said sender somewhere in the display of information about said email to call attention to said email.

The first step in this process is receiving an email. This is a conventional process and can occur in a web mail server or a recipient computer. The domain of the sender can be different than the domain of the receiver, and this distinguishes any prior art where buddy icons or other graphics are displayed with received emails.

The second step is using a mail user agent to control a computer to display information about the email along with the graphic. This can be done by processing at a web mail server or at a recipient device capable of displaying emails.

Figure 3:
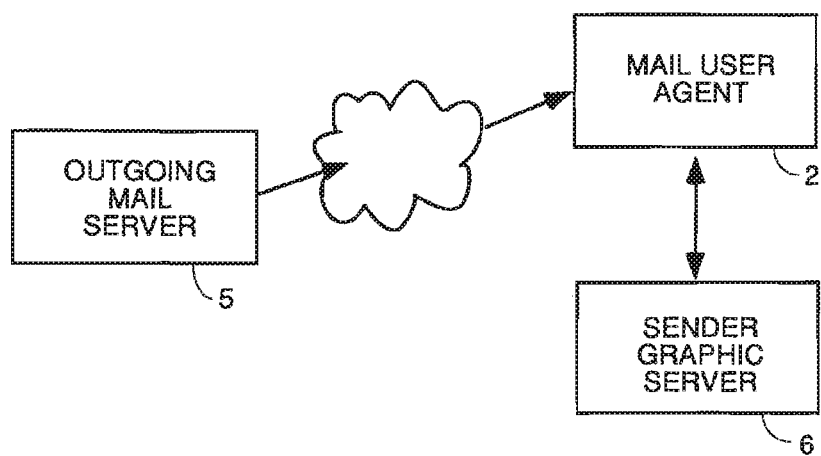
FIG. 3 is a block diagram of a typical system in which the genus of processes using graphics such as buddy lists to call attention to emails occurs.

FIG. 3 is a block diagram of the environment in which one embodiment is carried out where the graphic is retrieved by a mail user agent from a graphic server. In this species, mail user agent 2 controls its host computer to receive an email from an outgoing mail server 5. In response, the mail user agent 2 retrieve the sender's graphic from a sender graphic server 6. In alternative embodiments of this species, the graphic may be stored in the header of the email or in an email attachment. In another alternative embodiment of this species, the graphic is stored in another server out on the internet, and the location of the graphic is pointed to in information supplied in the email, or the graphic is pointed to in information obtained by the mail user agent. In another alternative embodiment, the graphic is retrieved from local storage.

The processing at the web mail server in the preferred embodiment would include exporting data regarding the email to a device capable of displaying email (the recipient device) which established a session with said web mail server and exporting data which includes the graphic or a pointer to where the graphic may be obtained by the recipient device. The exported data would cause a mail user agent at the recipient device to display information about the email along with a graphic.

An example of one species within this embodiment is a display which step 2 creates in a device capable of displaying emails a display of a list of emails with buddy icons displayed next to the sender column, as shown at 30, 32 and 34 in FIG. 2. Other alternative embodiments within this genus would be: 1) to use said mail user agent to retrieve said graphic from said header of said email; 2) to use said mail user agent to retrieve said graphic from an attachment to the main body of said email; 3) using said mail user agent to retrieve the graphic from a contact manager which stores information associated with each sender; 4) using two or more processes to carry out the functionality of the mail user agent.

Value Added Process for Web Mail

Currently, web mail services exist, but the functionality of limited to the services the web mail server provides. It is useful for a client computer or other device which is capable emails such as a cell phone or PDA to be able to add its own functionality to the web mail service. Examples of additional functionality that would be useful include using a valued added process on the recipient device that can analyze emails to recipient and determine automatically which emails are spam and take appropriate action. Another example of a value added process is authentication and integrity checking and displaying a Truemark associated with a sender of any email which passes authentication and integrity checking. Another example is display of a graphic such as a buddy icon with any email which has been sent by a sender who has designated a graphic to be displayed with said sender's email. The steps of the value added genus process are:

1) detecting an event in a device capable of displaying emails indicating a browser has or is attempting to contact a web mail service;
2) intercepting events returned to said browser by said web mail service;
3) controlling said device capable of displaying emails in an email account to either: 1) implement any value added service associated with an email: 2) present as a display on said device a method to access value added services pertaining to said emails being displayed; 3) incorporate data into a display of said emails which would not otherwise be there.

Figure 9A:
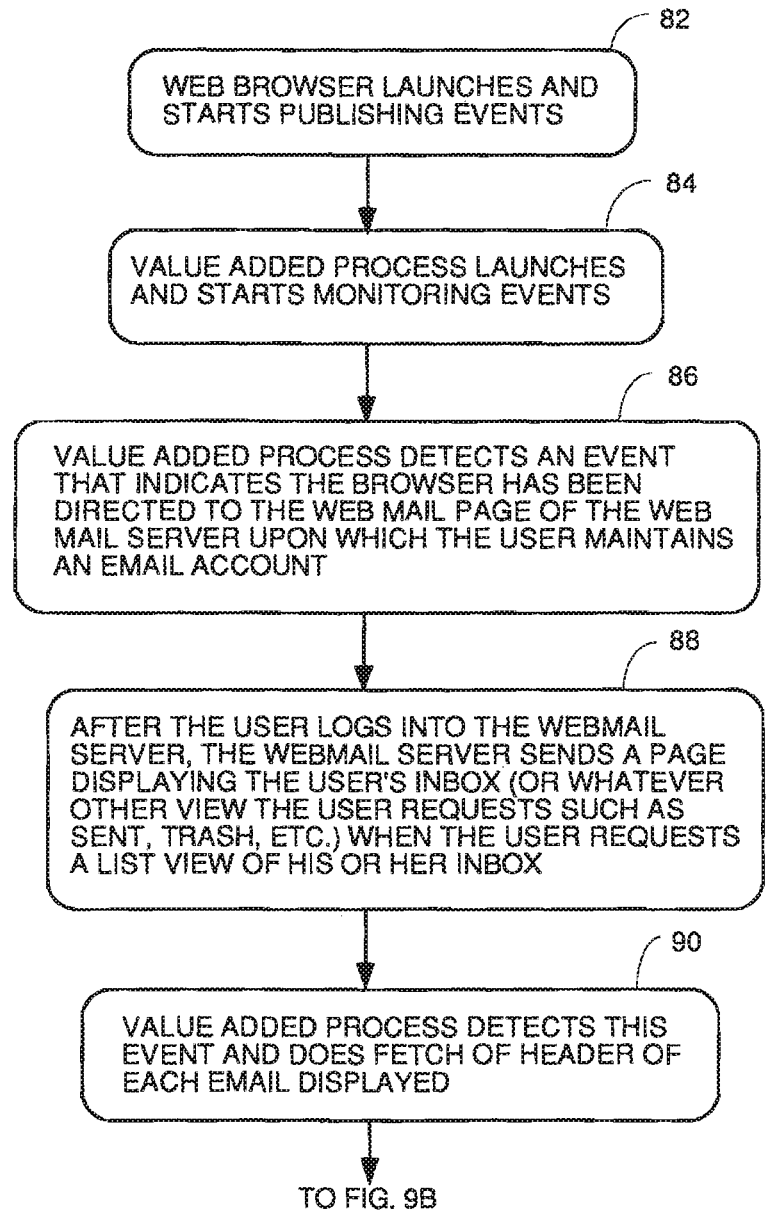
FIG. 9, comprised of FIGS. 9A through 9C, is a flow diagram of one embodiment of how one species of the value added process cooperates with a web browser, a web mail server and the assignee server and the client computer TCP/IP stack to generate user interface displays in accordance with a class of embodiments using stemps.

In this genus, a value added process executing on a device capable of displaying emails monitors events published by a browser and detects the fact that the browser of said device has established or is attempting to establish contact with a web mail service. When such contact is established, the user of the device typically logs into the web mail service and requests a list of new emails. The web mail service host server then looks up the user account and exports data to the device which causes the device to display a list view of the recipient's emails. This data is intercepted or monitored by the value added process. The final step involves controlling the device to either: 1) implement any value added service pertaining to emails being displayed which would not otherwise be provided by the web mail server (such as authenticating and integrity checking, or spam detection, or spam detection and moving email classified as spam into a spam folder, or deleting an email classified as spam stored on a web mail server so that the spam mail never gets displayed on the client device); 2) present a method to access value added services pertaining to said emails being displayed which would not otherwise be there (such as a link to trigger an authentication and integrity check, or a button to mark an email as spam); 3) incorporate data into a display of said emails which would not otherwise be there (such as presenting a Truemark for emails which have passed an authentication and integrity check, or a mark indicating that an email has been classified as spam). A flow diagram for this process is presented as steps 82, 84, 86, 88 and 90 of FIG. 9A where step 90 is replaced by any one of the three options described above for step 3 of the process.

The value added service that controls a client device to do spam detection or spam deletion or detection of spam and moving it to a spam folder can be implemented in any of the ways these function have been implemented in the prior art. Specific examples of prior art which performs some or all of these spam management functions are: manual selection of an email followed by receipt of a user command indicating the email is spam, using a black list of spam sender address or spam domains (which can be built automatically from manual markings of email as spam), using keywords such as Viagra to detect spam, using Bayesian analysis, using voting algorithms where each client can mark an email as spam and the results for that type of email are calculated and used by the rest of the community, using learning algorithms based on individual spam classification behaviors, etc. These are all ways of detecting whether an email is spam.

Once an email is detected to be spam, the value added service can add new functionality for spam management that is not already present in the web mail service. For example, the value added service can intercept data regarding the display of an email which has been found to be spam and modify that data to cause a spam graphic to be displayed next to the summary line for that email in a list view. In an alternative species, the spam management service can send commands to the web mail service pertaining to a particular email which has been detected to be spam in any of the ways above, said commands simulating button clicks or other user commands that a user of the web mail service would give to delete a particular email or move an email to a spam folder. In an alternative embodiment, the spam management service could intercept data from the web mail service controlling the browser to display an email which has been detected to be spam and modify that data such that the spam email is not displayed.

Figure 21:
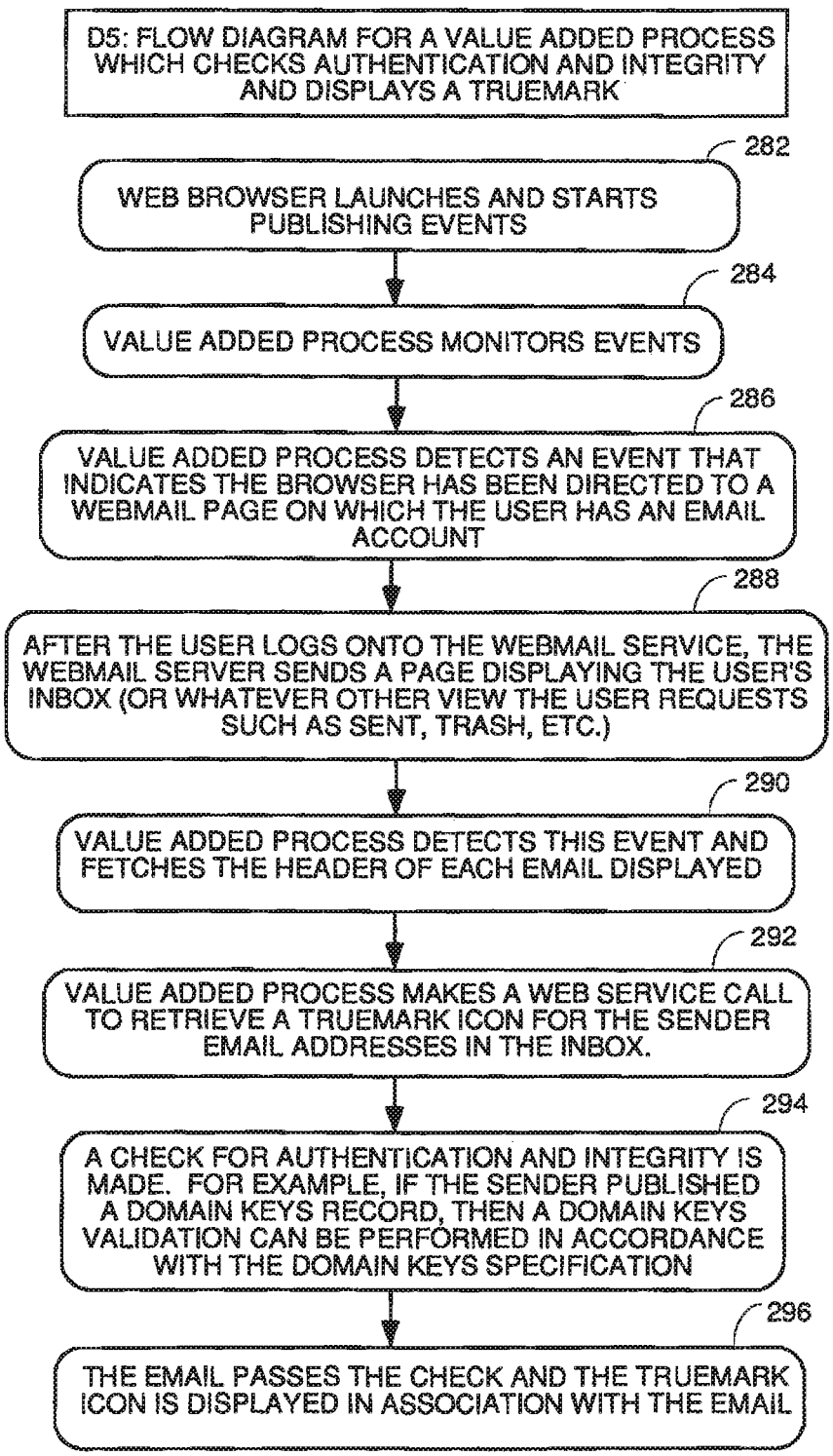
FIG. 21 is a flow diagram of a preferred embodiment carried out by a value added process to authenticate and integrity check incoming emails and display Truemarks.

A specific example of a species within this genus is the flowchart of FIG. 21 (D5) where the value added service is an authentication and integrity check followed by display of a Truemark for emails which passed authentication and integrity checking. Other examples of species within this genus are: 1) implementing said value added service as a browser plug-in which controls said device to display information about emails in accordance with data supplied by said web mail service along with calling attention to one or more categories of said emails in any humanly perceptible way; 2) implementing said value added service as a server process for channeling browser calls to said web mail service; 3) implementing said value added service value added as a check email for authentication and/or integrity of an email; 4) implementing said value added service by presenting a function which a user can invoke to mark an email as fraudulent or as spam; 5) implementing said value added service as a service which automatically goes through a web mail email inbox and creates a contact list generated from emails listed therein, said contact list being selectively displayable upon command from the user.

Antiphishing Genus

A process to prevent con artists from sending emails purporting to be from somebody else and asking for information that can be used for fraud (phishers) is very useful and adds to the trust of email. The genus of such processes is defined by the following steps:

receiving an email from a sender using a mail user agent;
accessing said sender's fraud policy and checking said received email against said fraud policy to determine if said email is fraudulent; and
if said received email fails the requirements published as part of said fraud policy which includes as a minimum requirement that said received email pass authentication and integrity checks, controlling a device capable of displaying emails to display at least some information about said received email and provide information indicating said email is fraudulent.

This genus of processes can have the various steps done anywhere on the receiving side of the email transaction. A typical email environment includes a mail transfer agent server (generally the incoming mail server) coupled to a mail user agent. The antiphishing process can have various ones of its steps performed at any of these three computers. There are multiple embodiments to be described below. The second step of accessing a sender's fraud policy and checking the email against the fraud policy has a substep of first authenticating the email as being from the sender it purports to be from and/or performing an integrity check to ensure the email has not been tampered with. All sender fraud policies will include such an authentication and/or integrity check. The fraud policy may also include other requirements such as all legitimate emails from the sender must come from a specific domain owned by the sender.

Figure 4:
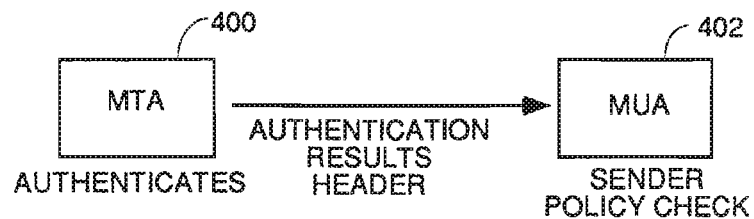
FIG. 4 is a diagram of the first species in the antiphishing genus where the authentication/integrity check and sender policy check are done at different locations.

Referring to FIG. 4, there is shown a diagram of the first species in the antiphishing genus where the authentication/integrity check and sender policy check are done at different locations. In this embodiment, the first step of receiving an email from a sender and the portion of the second step involving authentication and integrity checking are performed at the mail transfer agent 400. The mail transfer agent then inserts an authentication header in the email which includes the result of the authentication and/or integrity check and forwards the email to a mail user agent 402. The mail user agent then access the sender's fraud policy from wherever it is stored and check the email against the fraud policy. The authentication header is used to determine if the email passed authentication and integrity checking, and then, if so, any other requirements of the fraud policy are checked against the email to ensure it complies with them. If the email does not satisfy all requirements of the fraud policy, the mail user agent controls a device capable of displaying emails (a recipient client computer, cell phone, PDA etc.) to display some information about the email and to provide information that the email is fraudulent. This can be done in a number of different ways such as displaying a fraud icon next to the sender column of the fraudulent email, displaying a pop up box when a mouse cursor passes over the email which includes text indicating why the email failed the fraud policy, etc. In some embodiments, any email from a sender with no fraud policy will be marked as fraudulent.

Figure 5:
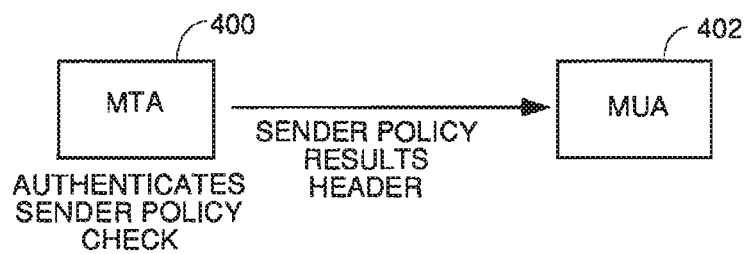
FIG. 5 is a diagram of the environment in which another species in the antiphishing genus is performed where the authentication/integrity check and sender policy check are done at the mail transfer agent.

Another species within this genus is illustrated in FIG. 5. In this species, the mail transfer agent 400 does the authentication and/or integrity check and also accesses the sender's fraud policy and checks the received email against the fraud policy. A policy results header is then added to the email before it is forwarded which includes result data indicating whether the email met all the requirements of the fraud policy. The mail user agent 402 then uses the policy results header contents to control a device capable of displaying emails to display information about the email and to provide information indicating the email is fraudulent if that is what the data in the policy results header indicates. Again, the way the information is provided that the email is fraudulent can be several different ways.

Figure 6:
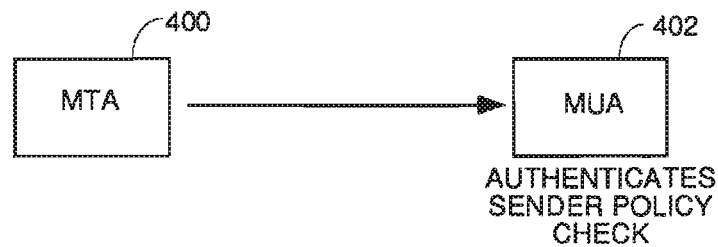
FIG. 6 is a diagram of the environment in which another species in the antiphishing genus is performed where the authentication/integrity check and sender policy check are done at the mail user agent.

Another species within this genus is illustrated in FIG. 6. In this embodiment, the mail transfer agent does what mail transfer agents do and nothing more. In this embodiment, a mail user agent 402 receives the email from the mail transfer agent and does the authentication and/or integrity checking. The mail user agent then accesses the fraud policy and checks the email against that fraud policy. If the email fails to meet the requirements of the fraud policy, the mail user agent controls a device that is capable of displaying emails to display information about the email and provide information that it is fraudulent. This can be done by a browser plug in executing on a recipient's client computer (or cell phone or PDA) which receives data from the mail transfer agent as a web mail server. The plug in does the authentication and/or integrity checking and accessing of the sender fraud policy and comparison of the email to the fraud policy. Then if the email fails, the plug in intercepts the data being sent to the operating system by the browser and modifies it to display a fraud icon in or next to a summary line about the email in a list view or displays a popup when the email is moused over that displays information about the email indicating that it failed the fraud policy or why it failed the fraud policy.

In all these species, emails for which the sender has no fraud policy are either marked as fraudulent or are called attention to in some other way to indicate to the user that the authentication and/or integrity of the email cannot be confirmed. This user interface mechanism can be any humanly perceptible mechanism such as coloring the summary line about the email yellow or playing a sound when the email is moused over, etc.

Various Alternative Embodiment Species within the Teachings of the Invention

There are described below various species within the various inventive classes defined above. To the extent any of the descriptions below conflict with the definitions and genus descriptions above, the definitions and genus descriptions given above control, and the conflicting definition or genus below is a species within one of the above defined genus or an alternative genus.

First, with regard to Truemarks, in some embodiments emails can only be displayed with Truemarks which are known to come from a domain or sender which is known to be associated with a client who has satisfactorily proven a right to exclusive use of a Truemark. In the some embodiments, a Truemark must be a registered trademark or service mark. In other embodiments, it can be an unregistered corporate logo or other behavior which a computer can carry out or be adapted to carry out and which can be perceived by humans. In some species, Truemarks can be ways of bringing attention to emails in various categories in various ways such as: brands, logos, trademarks, music, sound marks, color marks, displays of authenticity certificates, etc. This gives the client a protected advertising space in which to generate trust in its customers that emails from this client actually come from this client.

Any hardware architecture and software structure which can cause to happen this special "bringing attention" user interface to one or more categories of emails will suffice. In some embodiments, multiple categories of emails are called attention to by the user interface in different ways, and this can be done at the mail user agent or the incoming mail server which controls the displays on a device capable of displaying emails. In some embodiments, the computer programmed to cause the special display (or any other means of calling attention to the different categories of emails in different ways) can be a web mail server such as the Yahoo or Comcast web mail server or an email client such as Outlook or Outlook Express, or a conventional web browser or email client coupled with another value added process such as a plug in which controls the computer to implement the novel user interface.

In some embodiments, this special user interface is coupled with background authentication processing to verify that each email not marked with a fraud logo is from the domain it appears to be from and has not been tampered with. In the some embodiments, the email space is protected from phishers and others trying to pass themselves off as the branded sender or trying to tamper with their messages. The visual space provides an instant visual hierarchical view of emails in different categories in some embodiments through the use of different kinds of logos displayed with each email in one of the categories to which special attention is to be called. In some embodiments, the different categories are: a cross product of authentication and integrity (pass, fail, unable to verify) and reputation—branded sender with a Truemark customer, buddy, non buddy member, non member. In some embodiments, Truemark customers have a "flag-unauthenticated-as-phishing" (FUAP) option. If that option is set, then all unauthenticated emails from their domain will be presented as fraudulent by the value added service that implements this class of embodiments.

In some embodiments, a value added program implements a process to cooperate with the web browser or email client, a web mail server or other server operated by the assignee to modify the data being displayed so as to cause the special user interface display (or other ways of calling attention to the different category emails) that calls attention to the different categories of emails.

In some embodiments, the computer which causes the special display is a web mail server, and it is programmed to do the normal functions of a web mail server to store emails of each customer and send to that customer's computer display data which shows the customer which emails he has received. However, in other embodiments it is also programmed to authenticate the email. This can be done using Domain Keys technology or by cooperating with a server run by the assignee to authenticate emails using digital signatures or any other authentication technology. In some embodiments, web mail server also cooperates with a server controlled by the assignee which may store buddy list graphics, Truemarks, personal information about registrants, authentication results, fraud policies, status of senders, etc. This cooperation is used in these embodiments typically to determine the status of each email sender and use the authentication results to modify the data being sent for display on the client computer so as to cause the special display or other user interface functions which call attention to emails from branded senders, white list senders and fraudulent emails in different ways. In some embodiments, emails directed to each user are categorized by the web mail server into different categories: branded sender, white list, fraudulent, all other. The web mail server in these embodiments then controls data sent to the client computer to display (or otherwise call attention to) the user's emails in each category in a different way.

In some embodiments, the emails which are in the categories that are called attention to in different ways have a verifiable piece such as the identity of the sender, a verifiable digital signature or verifiable metadata with one of the categories being emails which did not verify properly In some embodiments, there are three classes of emails which are called attention to in different ways: emails from branded senders; emails from white list senders and emails which are known to be fraudulent. A determination that an email is fraudulent can be in any way known in the prior art. For example, in some embodiments, checks can be made to determine if something has been tampered with such that a reconstructed digital signature did not decrypt properly into the same hash that was originally used to generate the digital signature transmitted with the email.

In some embodiments, the user interface will not display an email unless the email has been authenticated. Authenticated, in some embodiments means the identity of its sender has been verified or that nothing has been tampered with since the email was created, or both. In other embodiments, the ability to display metadata about the email is presented as a tool to the user such as the mouseover embodiments described below. In some embodiments, the email is protected by including the header and the main body and any other parts that need to be protected as inputs to a digital signature algorithm that hashes and/or encrypts all the parts and uses the result as a digital signature.

In some embodiments, creation of the digital signature can be done at the sender computer or at an outgoing mail server of an internet service provider (ISP). In other embodiments, authentication of an email can be performed by the incoming mail server of an ISP or at the client computer of the recipient of the email or by cooperation between the client computer and a server run by the assignee or the incoming mail server of the ISP. In various alternative embodiments, authentication is done by any known process such as: 1) using the Domain Keys service; 2) by recreating the digital signature and comparing it to the digital signature in the email; 3) Identified internet mail (IIM), 4) by cryptographic processes being developed by the MASS group in the Internet Engineering Task Force (IETF); 5) by the procedures described in a U.S. patent application entitled METHOD AND APPARATUS FOR IMPLEMENTING A MICROPAYMENT SYSTEM TO CONTROL E-MAIL SPAM, filed Feb. 12, 2004 and having Ser. No. 10/778,956, which is hereby incorporated by reference; 6) by SPF/SenderID or S/MIME processing.

In some embodiments, the following process can be used to implement a user interface to call attention to various categories of emails:

receiving data pertaining to incoming emails addressed to a recipient;

determining whether each said email is authentic in any way;

determining a category into which each email falls based upon the sender of said email; and generating data to cause a computer to call attention to each email addressed to a recipient in a different way depending upon into which category said email fell.

A genus of alternative embodiments pertaining solely to processes for operating a computer to call attention to emails in different categories in different ways is defined by the following characteristics that all embodiments in the genus will share:

after a category in which said email's sender falls has been determined, generating commands and/or data which cause a computer to call attention to emails in each of a predetermined number of categories in different ways; and using said data to cause a computer to call attention to emails in each of a predetermined number of different categories in different ways.

The different ways can be: displaying different logos for each class; different colors; different scents or vibration patterns for each class; different behavior of the computer on mouse over of emails in different categories; associating emails with cost incurred by the sender or recipient by quantifiable metrics; filtering or sorting of emails by category and by cost incurred to send them by any quantifiable metrics; or anything else which would give a user a sensory cue as to which emails fall within which classes.

Referring to FIG. 2, there is shown a screen shot of the user interface for some embodiments in the form of an email inbox the way it is displayed in one embodiment when Yahoo!_web mail is used and when the computer is being operated in accordance with the teaching of the user interface embodiments. The order of the emails in the inbox display is determined by the Yahoo web mail application running on the Yahoo server. But there is a process running invisibly in the background on the client computer (the one the email user is sitting at when he or she directs the client computer browser to the Yahoo web mail server's URL. This process interacts with the client computer web browser, the server of the assignee of this patent application and the web mail server at which the user has an account to cause the display of FIG. 2. Any way in which the interactions occur to cause a display or other indication which can be sensed by a human which brings to the attention of the user in some way the branded emails, the white list emails and the fraudulent emails will suffice to practice this class of embodiments. In other words, displayed logos or trademarks are not the only way attention can be called to specific emails. Other embodiments are specific tunes, sounds, jingles, scents, vibration patterns etc. whenever an email in a displayed list view is selected or moused over.

In some embodiments, there is a value added process running on a client computer (50 in FIG. 7) that controls generation of a display on a client computer of an inbox in which the user's emails are displayed (the display can also be of emails moved to trash or sent emails). This process or functionality will be called the value added process in some embodiments because it alters the display of the inbox (or causes some other user interface sensory event) to call attention to emails in the various categories described herein differently. The program that implements this process will be called the value added program in these embodiments. In other embodiments, the value added process is executed on a web mail server (56 in FIG. 7) and cooperates with a web mail program to control the data that is sent by the web mail program to the client computer so as to cause the web browser of the client computer to control the client computer to display emails in various categories differently so as to call attention to them.

In an important alternative embodiment, the functionality of a value added program is integrated into a web mail application program executed on the web mail server such that the web mail application program implements a process which includes the functionality of the value added process so as to transmit data to the client computer's web browser which forces it to display a list of emails in so as to call attention to emails in the various categories described herein differently. The functionality of the value added process is incorporated into the functionality of an email client.

In some embodiments, there are four categories of emails which the user interface displays in different manners so as to call attention to the emails in each category in a different way.

The first category of emails which this class of embodiments calls attention to for the user is email from a certified sender who has authorized a service to display the email with the Truemark of that sender. Corporate branding is very important to marketing strategies of many corporations. For example, Federal Express does not want its emails to be buried amidst hundreds of spam messages and other messages cluttering a user's inbox. Branded senders appreciate the branded email space which is protected from phishers and persons who may wish to tamper with the branded senders emails all of which is provided by the value added process described herein. Most companies spend more money on marketing than they do on research and development, so this protected email space where they can send messages to their customers cheaply is a very valuable tool to them.

In one embodiment, certified/branded senders who want their registered trademark (or other corporate logo) used have their Truemark displayed in the sender column 10. Examples of emails from certified/branded senders in FIG. 2 are shown at lines 12, 21, 26. In each case, a registered trademark or Truemark is displayed in the sender column of the email as opposed to the name of the sender.

In another embodiment, the second category of emails that are displayed in a special way in the inbox (or any other list view) to draw attention to them is emails from buddies or people on the recipient's white list. A white list is a list of senders from whom a recipient is happy to receive mail. White list emails are displayed, in this embodiment, with a logo to the left of the sender column. However, in other embodiments, the logo for a white list sender could be placed in the sender column and displayed in a different color or displayed to the right of the sender column and to the left of the subject column 28. Examples of the displays in this embodiment of white list emails are shown at lines 30, 32, 34, 36, 38 and 40. In some embodiments, each white list sender can upload a logo, photograph, icon or other graphic (hereafter collectively referred to as a graphic or sender logo) they wish to have displayed with their emails. If they do not upload a sender logo, then a generic sender icon will be displayed for them. Examples of white list senders who have uploaded custom sender logos for themselves are shown at lines 30, 32 and 34. Examples of white list senders who have not uploaded custom logos and who are using generic logos are shown at lines 36, 38 and 40.

In some embodiments, the third category of emails that this class of embodiments calls attention to set them off from emails in all other categories is known fraudulent emails such as emails from phishers, domain spoofs or emails which are suspected to be fraudulent such as emails from persons or addresses known to have sent fraudulent emails in the past. Hereafter, known fraudulent emails and emails which are suspected to be fraudulent will collectively be referred to as fraudulent emails.

Phishers are people who send emails and attempt to pass themselves off as somebody they are not. One way in which phishers are detected is described in prior U.S. patent application entitled USER INTERFACE AND ANTI-PHISHING FUNCTIONS FOR AN ANTISPAM MICRO-PAYMENTS SYSTEM, Ser. No. 10/935,260, filed Sep. 7, 2004, which is hereby incorporated by reference. Any way in which phishers and fraudulent emails are detected or emails are classified as suspected fraud will suffice for purposes of practicing some embodiments. All that the user interface embodiments requires is that once an email has been determined to be fraudulent, that it be set off or called attention to in any manner from other emails in other categories. This can be done in any way. In FIG. 2, a known fraudulent email is shown at line 42 and is set off by the display of a fraud icon to the left of the sender column. In other embodiments, a distinctive color or font is used with a strikethrough at least the subject line and with a special fraud alert logo shown to the left of the sender column. A pop up box with a stop sign or some other warning in it which is displayed on mouse over could also be used or a sound mark on mouse over could also be used. Any one or more of these techniques or any of the alternative techniques described below can be used to call attention to the fraudulent email.

Alternative User Interface Attention Grabbing Mechanisms

In some embodiments described so far, logos placed in specific positions have been used to set each of the first three different categories apart from the other categories. Visual logos are preferred because they are well known and easy to implement. However, in some embodiments, different colors for each category could be used where multiple categories are called attention to or Truemarks are involved. In other embodiments, different sound marks could be played whenever an email is added to the inbox depending upon the category of the email or whenever the user "mouses over" the email.

The process of passing a cursor over some part of an email will be referred to herein as a "mouse over". With respect to sound discrimination, branded senders could have a unique sound mark which is different for each branded sender, a white list sender could have a second generic sound mark or a unique sound mark and known fraudulent emails could have a third sound mark. In some embodiments, these sound marks could be played either when the email arrives or when the user passes the cursor over some designated part or any part of the email's display in the inbox. In some embodiments, different scents or different vibration patterns could be emitted from the computer when an email is added to the inbox or "moused over", each category having a different scent or vibration pattern.

Various embodiments use positioning of a corporate logo, white list logo and fraudulent email logos as shown in FIG. 2 because it give an immediate discriminatory picture based upon placement. Other embodiments may use different types of logos in the sender column with a mouse over pop up that identifies the sender with more specificity. In some embodiments, if the cursor or insertion point is located over an email being displayed, information about the identity of the sender is displayed. That information may be stored locally or may be fetched from a server 58 (which can be a single server or a distributed server function) by the value added process sending the sender's email address or ID to the server 58 in FIG. 7 with a request to send back identity information from a sender profile stored by said server 58. This server 58 can be any trusted server operated by anybody which cooperates with the other processes described herein to perform the functions described herein (hereafter referred to as the assignee server although the assignee of this patent application may not actually own or operate this server).

In some embodiments, when the cursor is over an email, the value added process uses the email address (or identity) of the sender to look up information about the sender including the sender's identity. This information is included in data transmitted to a web browser on the client computer to cause the client computer to display a pop up box or special window in which the identity of the sender of the email is displayed.

In some embodiments, the value added process paints an inbox display shown in FIG. 2 or any of the other alternative embodiments is a plug in which is downloaded from the assignee's server to the client computer. In some alternative embodiments, the functionality of the value added process 74 is implemented in the web mail server 56 in FIG. 7 and the client computer 50 has only a conventional browser which accesses the web mail service and is told what to display by said web mail service. In one multiple category embodiment, the value added process is a process which runs on the web mail server of an ISP like Yahoo or Comcast and which transmits data downstream to the client computer browser to cause it to paint a display of an email inbox along the lines of FIG. 2 to call attention to the different classes of emails in different ways.

Figure 7:
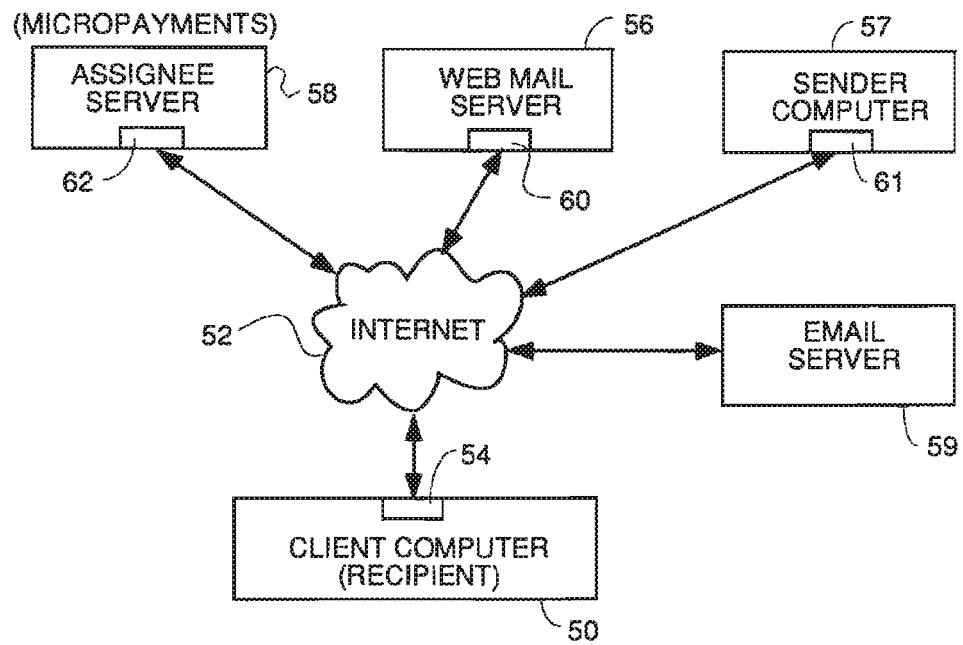
FIG. 7 is a block diagram of a hardware architecture in which certain embodiments are practiced.

FIG. 7 is a block diagram of one embodiment for a system of computers in which some embodiments of the invention are practiced and in which the other interactions described herein occurs.

Figure 8:
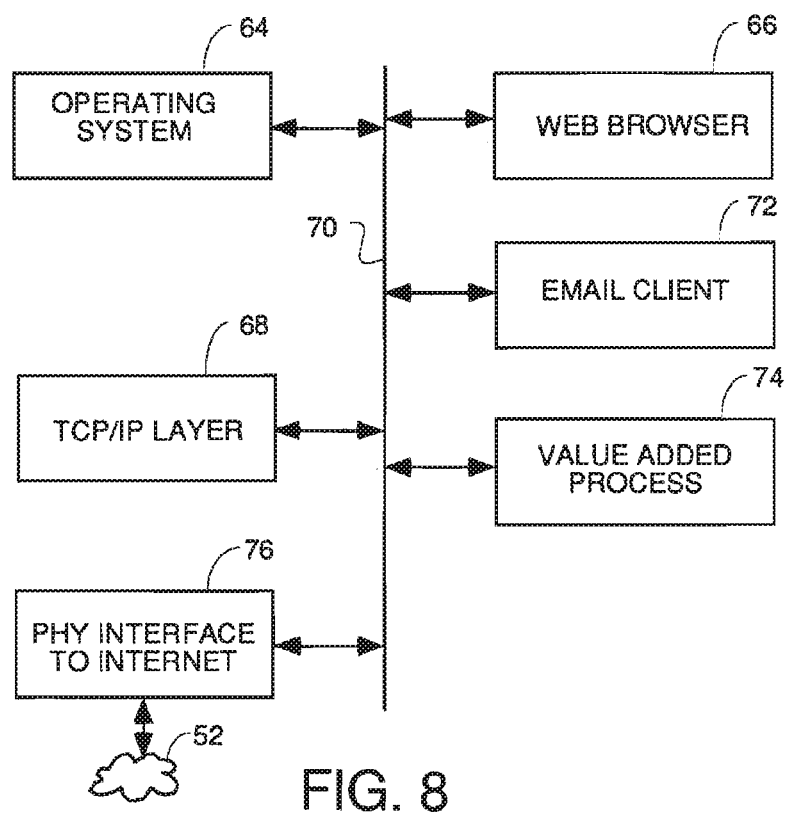
FIG. 8 is one possible software architecture which shows the various software programs and physical layer interface to the internet which forms one possible environment in which certain embodiments are carried out.

FIG. 8 is one embodiment for a software architecture in which some embodiments of the invention may be practiced.

Referring to FIG. 7, a client computer 50 is connected by some physical layer interface 54 such as a cable modem, dial up modem, Directway modem or dial up modem, or wireless connection. The client computer typically has a display, keyboard, pointing device, central processing unit, memory and a bulk storage medium of some sort is coupled to the internet but it may be on a cell phone or something not classified as a computer such as a PDA, Blackberry, etc. with no keyboard and possibly no pointing device). A web mail server 56 such as the Yahoo web mail server and an email server 59 such as is operated by many ISPs are each coupled to the internet by a physical layer interface such as a cable modem, DSL modem or TI interface. This is an example architecture only and no all elements shown are necessary in every embodiment. The same is true for server 58 operated by the assignee of the present invention (hereafter referred to as assignee server).

Each of the servers 58 and 56 runs application software (not shown). The application software for the web mail server 56 includes a web mail application which gathers and stores email directed to the owners of each email account (referred to as an email subscriber). The webmail server 56 stores incoming emails directed to persons having accounts with the service in such a way that each email subscriber's emails can be retrieved by the web mail application program on demand.

This web mail application also receives requests from client computers to display the user's email and fetches the emails directed to that user. In some embodiments, only emails which have not already been downloaded by the user [webmails usually don't download emails at all—email clients are the ones that download mail] are fetched for display.

In one embodiment, each fetched email is then categorized into a category to which attention will be called to the user of the web browser. This can be done using the source email address of the sender or the sender's ID number assigned by the assignee.

The web mail application (in embodiments where the value added process is integrated into the web mail process) then sends packets to the web browser of the client computer 50 to cause the web mail browser to display the list view of emails or whatever else was requested.

In conventional web mail applications like those executed by Yahoo, Hotmail or Comcast servers there is no bringing to attention of emails in certain categories. However, in one embodiment, the web mail application program cooperates with a value added process running on the web server to modify the display data sent to the client computer so as to call attention to emails in certain categories in different ways. In this embodiment, the value added process executing on the web mail server cooperates with the web mail process also executing on the web mail server to intercept the data transmitted to the web browser of the client computer. The intercepted data is modified prior to transmission by the value added process such that the inbox displayed by the client computer will have emails belonging to certain categories displayed in certain ways to call attention to the category they are in. In this species, the categories will be displayed with logos for each category displayed in distinctive locations to call attention to each email in a particular category. In other embodiments of this subclass of embodiments, the data transmitted by the value added process to the client computer will cause the client computer to emit some sound or odor or other sensory output for each email in a specific category to call attention to the emails in various categories in different ways.

In another important embodiment, the functionality of the value added process just described to control the client computer to call attention to emails in specific categories is integrated into the web mail application program itself. This functionality causes the web mail application to generate data for transmission to the client computer browser to cause the browser to call attention to various emails in different categories in different ways. Such a display could be like that shown in FIG. 2 or any of the alternative embodiments discussed.

In addition, each server has all the other hardware and software of internet capable servers including: a central processing unit; a hard disk or other bulk storage to which the computer is connected by suitable controllers such as RAID arrays; random access memory in all cases and read only memory in most cases; a network interface for coupling the computer to the internet such as by a cable modem, DSL modem, TI line, etc.

A sender computer 57 belonging to a branded/certified sender or white list sender or a phisher or other fraudulent user are each coupled to the internet 52.

Referring to FIG. 8 one embodiment of a software architecture in which some embodiments operate. Operating system 64 controls the client computer operations. Web browser 66 is launched by the user when a web page is to be downloaded from the internet or searched for [the browser launching means the browser is started. The action to look for is when the URL for the webmail service is accessed]. When the web browser is launched, it communicates with a software layer 68 via a data path 70. The data path 70 represents any method of software applications communicating with and cooperating with each other. Typically, data path 70 is a series of Application Protocol Interfaces (hereafter API) which allow each software process shown in FIG. 8 to communicate with any other software process shown in FIG. 8 by invoking function calls of the API of the software process with which communication is to be had. The function calls allows data to be passed to the software process and information to be obtained from the software process.

The email client 72 functions strictly to retrieve email from whatever email server 59 operated it is programmed to contact. When the email client launches, it either automatically or on command logs into an email server such as email server 59 with the appropriate user name and password. The value added process 74, in the preferred embodiment cooperates with the web browser or the email client 72 and the TCP/IP layer process 68 to control the client computer to implement the user interface and user interface process according to this class of embodiments.

In an important alternative embodiment, the value added process executes on a web mail server such as web mail server 56. In another important embodiment, the functionality of the value added process is integrated into the web mail process of the web mail server 56. In either of these two alternative embodiments, the value added process functionality, be it a separate process or integrated into the web mail server process, causes the web mail server process to transmit data to client computer 50 which displays the user's email and which causes certain categories of emails to be called to the attention of the user different through visual, audible or other sensor cues for each class of email. The classes are as previously discussed.

Figure 9B:
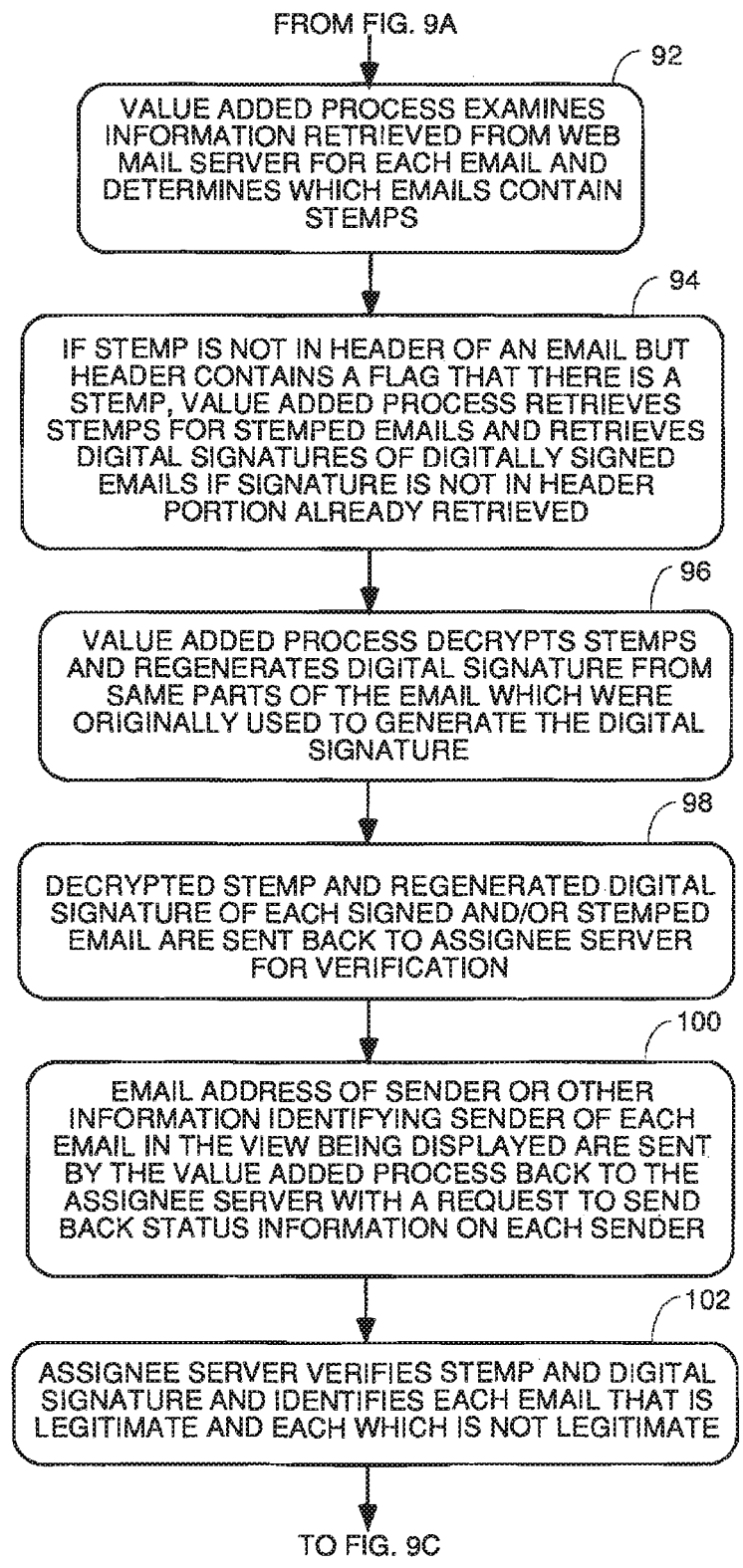
Figure 9C:
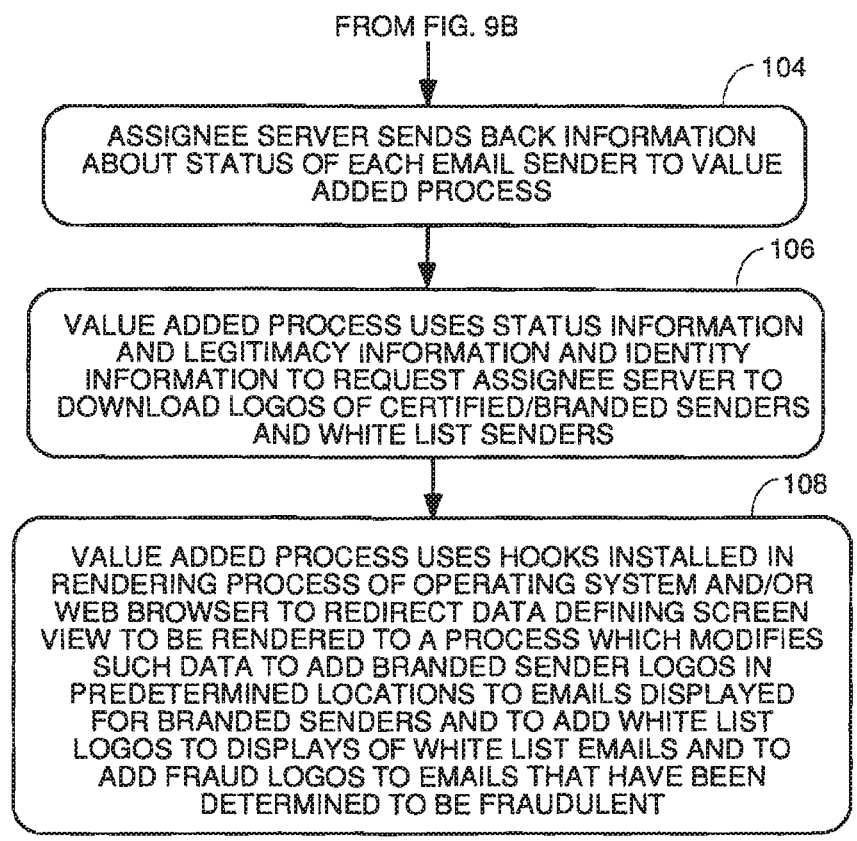

An exemplary process by which the value added process 74 cooperates with the web browser 66, operating system 64 and the TC/IP process and physical layer interface process 76 to communicate with the web mail server 56 (or an email server) and the assignee server 58 is shown in flow diagram form in FIG. 9.

It is assumed in FIG. 9 that the value added process has already been downloaded from the assignee server and installed on the client computer 50. It is also assumed that branded senders have gone through the manual verification process and have proved their ownership of the logo, authority to use the logo and uploaded the logo they want displayed with their emails to the assignee server 58. The logo will be stored as an image in the assignee server 58 or elsewhere with a pointer to it stored in the assignee server 58.

The process carried out by the value added server is slightly different depending upon whether the recipient of email (client) is using a web browser like internet explorer to retrieve view his email on a webmail server or is using an email client running on his machine to download emails from an email server operated by the company that maintains his or her email account. A webmail server maintains the emails on the server itself and also composes the displays and sends the display data to the web browser on the client computer for rendering on the client computer display.

In contrast, when an email client such as Thunderbird or Netscape Communicator executes and is asked to retrieve emails (or automatically makes a sweep for emails), it logs onto the email server where the user's account is located, identifies the client and asks that emails for the client be downloaded to the email client. The email client then stores them locally on the recipient computer and processes them in accordance with which view the user wishes (inbox, sent, drafts, trash, etc.). FIG. 8 is restricted to the interaction with the web browser and webmail server. FIG. 9 is directed to the interaction of the email client and the value added process.

The process of FIG. 9 also assumes that any branded/certified sender has already caused sender computer 57 to interact with the assignee server 58 to obtain an encrypted stemp (data indicating the email has had a micropayment made for the privilege of sending it to the recipient) and has put that stemp somewhere in the email (often in the header) and has sent the stemped email in the regular fashion. This stemped email is routed through the internet in conventional fashion and gets stored in web mail server 56. The process of FIG. 4 also assumes that emails sent to recipient have been digitally signed by the sender process and that the digital signing process involves processing of the header and body of the email and any other important parts that a phisher may try to spoof so as to ensure that no tampering of the email can have occurred after the email was sent so as to allow a phisher or other unscrupulous person to obtain any advantage from sending of the altered email.

The process of FIG. 9 starts with step 82 when a web browser on the client computer launches. As soon as the web browser launches, it starts publishing events which can be monitored by other software applications to inform any application which is listening what is happening with the browser. Step 84 represents the process of the value added process (typically a web browser plug-in downloaded from the assignee's server) launching when the web browser launches and starting to monitor events published by the web browser. The value added process may be running all the time in some embodiments, and, in other embodiments, it launches automatically whenever the web browser launches as a plug-in thereto.

Whenever the web browser is directed to a web page, it publishes an event so indicating. Step 86 represents the value added process detecting an event that indicates the web browser has been directed to the web mail page of a web mail server upon which the user maintains an email account. After the user enters a username and password to log onto the web mail server, the webmail server in step 88 sends a web page displaying the contents of the user's inbox or some other box the user selects such as sent mail, drafts, trash, etc. The page displaying the contents of the inbox is sent by the web mail server when the user selects a list view of his or her inbox.

Step 90 represents the process of the value added process detecting the event published by the web browser indicating a page representing the inbox's contents has been sent by the web mail server. Step 90 also represents the process of responding to the detection of this event by the value added process fetching the headers of each email displayed in the inbox from the web mail server.

Step 92 represents the value added process step of examining the header information retrieved for each email and determining which emails contain stemps. Step 94 represents the process of determining if a stemp is not found in the header of the email, whether there is a flag in the header indicating there is a stemp located somewhere else in the email. Step 94 also represents the process of retrieving the stemp from the main body of the email by doing a fetch of the main body of the email from the web mail server and finding the stemp therein. Step 94 also represents the process of retrieving the digital signature of any email which has been digitally signed to protect it from tampering. Digital signing is the process of performing some sort of hashing or encryption algorithm on various parts of the email that it is desirable to protect from phishers or other people who may wish to tamper with the email. Typically, unscrupulous persons may wish to tamper with the header and/or main body of the email to change the text therein. When these portions of the email have been used as input to a hash or encryption algorithm, a result which can be decrypted or dehashed results. This result is the digital signature. If an email has not been tampered with, repeating the hash or encryption algorithm on the same parts of the email which were previously used to generate the digital signature. Retrieving of the digital signature is from the header if it is stored in the header or the web mail server if it is stored somewhere else in the email besides the header.

Step 96 represents the process of the value added process decrypting the stemp and regenerating the digital signature using the same parts of the email which were used to create the original digital signature. If the digital signature only protects the header, then the retrieved header is used to regenerate the digital signature. If the main body or some other portion of the email was used, then the value added process retrieves the main body or whatever other part of the email which was originally used from the web mail server and regenerates the digital signature using the same hash or encryption algorithm as was originally used.

Step 98 represents the process of the value added process sending to the assignee server the decrypted stemp and the regenerated digital signature along with an identifier of the email from which these values were generated along with a request to authenticate the email to verify that it is the same email as was originally sent and has not been tampered with. Step 100 represents the value added process sending the email address of the sender of each email in the view being displayed (or other information identifying the sender of the email) to the assignee server with a request to send back status information on each sender.

Step 102 represents the process carried out in the assignee server of verifying the stemp authenticity for each decrypted stemp sent to it by the value added process. Step 102 also represents the process of comparing the reconstituted digital signature sent for each signed email by the value added process to the digital signature stored for that email in the assignee server. If the two match, then the email has not been tampered with and the email is not fraudulent and information is included in the status information sent back to the value added process for that email indicating that the email is not fraudulent. If the two do not match, information is included in the status information sent back for the email indicating it is fraudulent.

Step 104 represents the process of the assignee server using the sender address or other information identifying the sender to look up the sender's status in a database or lookup table. Each certified or branded sender and each white list sender is included in the database or lookup table. The database or table also includes the member number if the sender is a registered member of the assignee's protected email environment and either the trademark or other corporate identity logo or a pointer thereto for each branded sender who has passed the verification test and uploaded a logo or trademark to be displayed.

Step 106 represents the value added process using the status information and legitimacy information sent back to it by the assignee server to request the assignee server to download the logos of any branded/certified senders and the logos uploaded by any white list sender. If a white list sender has not uploaded a logo, information to that effect is included within the status information so that the value added process can use a generic white list logo it stores locally for display with the white list sender. In some embodiments, step 106 can be combined with step 104 such that the assignee server automatically fetches and sends to the value added process any branded sender logo or white list logo it has stored for any sender identified in the request message(s) from the value added process.

It is now time for the value added process to paint the display of the inbox in accordance with this class of embodiments to call attention to the branded/certified sender emails in one way and to call attention to the white list sender emails in another way and to call attention to the fraudulent emails in a third way. Any way in which these different classes of email are brought to the user's attention will suffice to practice this embodiment. Further, any way in which the value added process paints the display or modifies the information received from the web mail server to paint the display so as to call attention to the different classes of email will suffice to practice this class of embodiments. Typically, the web mail server sends back an html page displaying the inbox the way the web mail server wants it displayed. This data is received by the web browser which then converts the html page data into function calls and arguments which are sent to an API of the screen rendering process of the operating system which then controls the display driver to render the desired display. The value added process typically utilized hooks installed by it or which are already present in the operating system rendering process or web browser rendering process to redirect the data defining the desired screen view to a screen rendering process carried out by the value added process. This value added screen rendering process modifies the screen rendering data to cause it to define a display such as is shown in FIG. 2 or described as one of the alternative embodiments. The modified data is then sent to the operating system screen rendering process to paint the display.

Figure 10A:
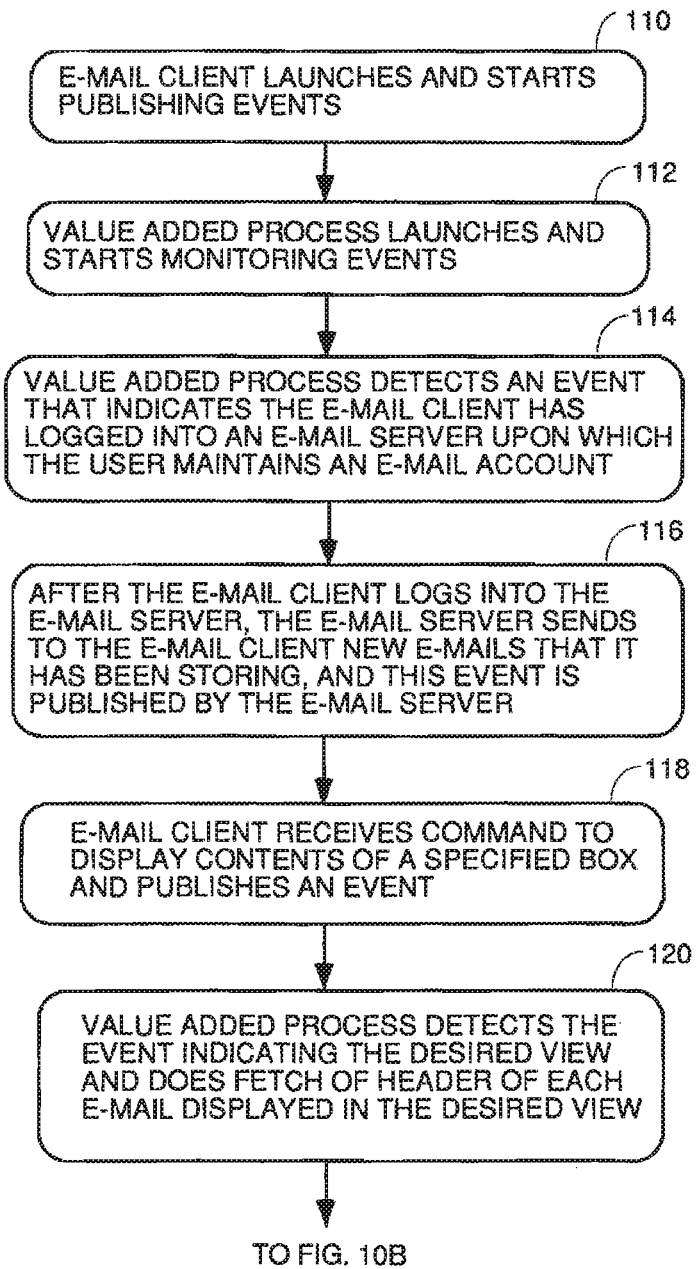
FIG. 10, comprised of FIGS. 10A through 10C, is a flow diagram of how one species of a value added process cooperates with an email client on a client computer, an email server and the assignee server and the client computer TCP/IP stack to generate user interface displays in accordance with another class of embodiments.
Figure 10B:
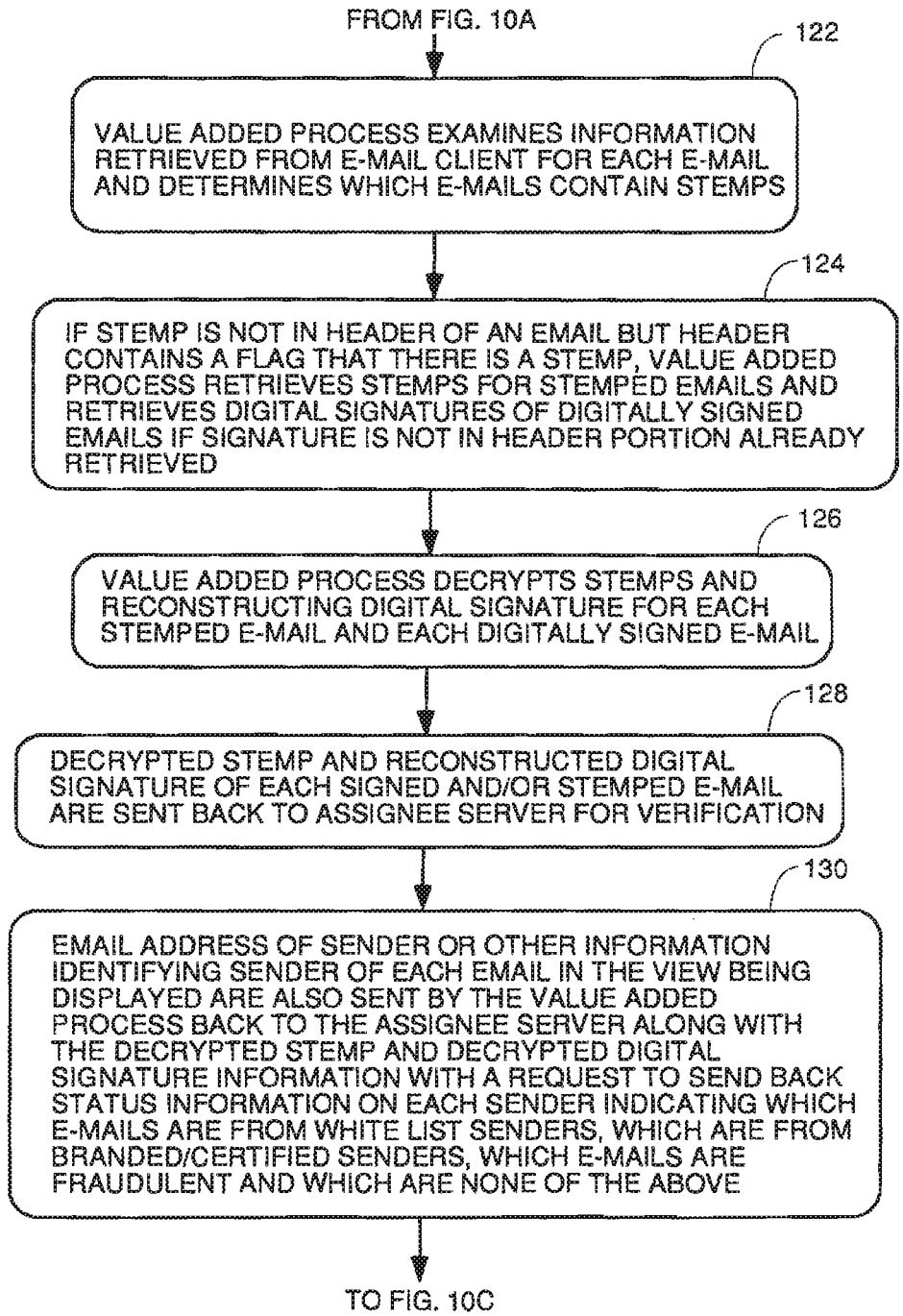
Figure 10C:
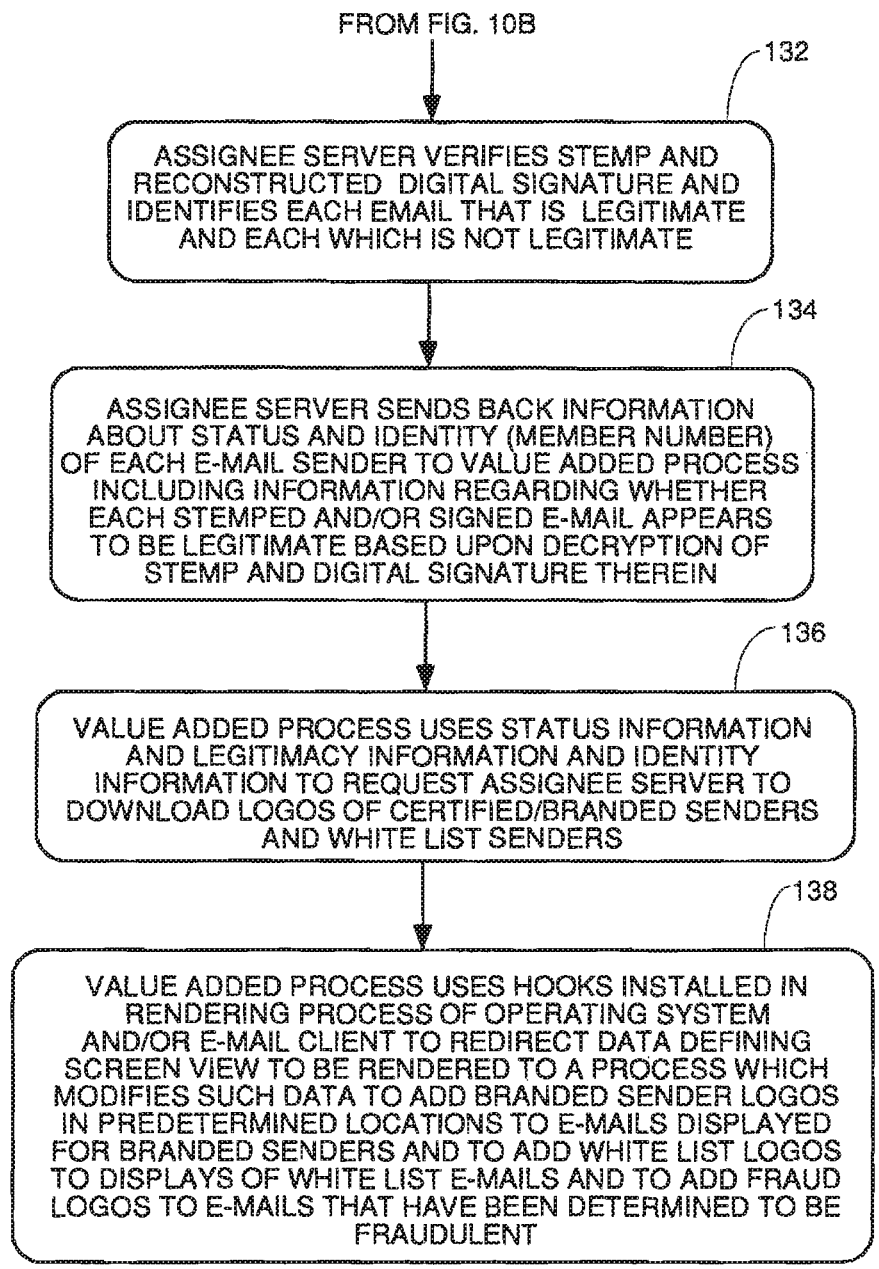

Referring to FIG. 10, there is shown one embodiment of a process for the value added process to cooperate with an email client, an email server, the operating system to generate a display such as that shown in FIG. 2 or one of its alternative embodiments.

Step 110 represents the process of the email client launching and starting to publish events. Step 112 represents the value added process launching and starting to monitor events. Typically, the value added process is a plug in which launches when the email client launches.

In step 114, the value added process detects an event which indicates the email client has logged into an email server upon which the user maintains an email account. In step 116, after the email client logs into the email server, the email server automatically sends to the email client new emails that it has been storing (or the email client requests them either as part of a periodic sweep or upon specific request from the user) in the inbox for the logged in user.

In step 118, the email client receives a command from the user requesting it to display the contents of some box such as the inbox, trash, sent mail box, drafts, etc. The email client publishes an event to that effect. In step 120, the value added process detects the event indicating the desired list view and does a fetch of the header of each email stored in the box which the user is viewing.

Step 122 represents the value added process examining the information retrieved from the email client regarding each email and determining which email contains a stemp.

Step 124 represents a determination by the value added process as to whether a stemp is in the header of the email or elsewhere as indicated by a flag in the header. The value added process then retrieves the stemp either from the header or fetches the main body of the email from the email client and fetches the stemp from the main body. The same process holds for the digital signature which is retrieved by the value added process from the header or the main body.

Step 126 represents the value added process decrypting the stemp and reconstructing the digital signature in the same manner this was done in the process represented by FIG. 9.

Step 128 represents the process carried out by the value added process of sending to the assignee server the decrypted stemp and the reconstructed digital signature of each signed and/or stemped email with a request for verification. Step 130 represents the process carried out by the value added process of sending to the assignee server the email address of the sender of each email or other information identifying the sender. This data is sent along with the decrypted stemp and/or reconstructed digital signature of each email and includes a request for status of each sender. The purpose of the verification and status requests is to determine which emails are fraudulent and which emails are from branded/certified senders and which are from white list senders. All the other emails will be in a "none of the above category".

Step 132 represents the assignee server process of verifying the authenticity of each email for which a decrypted stemp has been received and/or for which a reconstructed digital signature has been received. The assignee server stores the decrypted stemp and the digital signature created for each email. These values can be compared to the decrypted stemp and the reconstructed digital signature received from the value added process to determine if the email has been tampered with after it was first processed by the assignee server. Any email which indicates by these comparisons that some tampering may have occurred has a message sent back to the value added process indicating the email is fraudulent.

Step 134 represents the process carried out by the assignee server of using the sender email address of each email (or other identity information such as the member number) to look up the status of each sender. This look up accesses a database or look up table and determines which senders are white list and which are certified/branded senders. The assignee server uses the identity information to look up the location of any logo or trademark the branded senders have uploaded and any logo the white list senders have uploaded for display with their emails. The identity status and legitimacy information for each email is then sent back to the assignee server along with the location of any logo or trademark to be displayed with each legitimate branded sender or white list logo. In some embodiments, the assignee server accesses the logo or trademark image for each branded sender or white list sender and just sends any logo or trademark image for a legitimate email to the value added process along with the identity status and legitimacy status information for each email.

Step 136 represents the value added process using identity status information and legitimacy information regarding each email to determine which emails need to have a logo or trademark displayed and which type of logo or trademark to display for each. In the preferred embodiment, the value added process sends a request to the assignee server for each email which needs to have a displayed logo to download the logo or trademark for each email. If the logo or trademark image is stored as a web page on some other server other than the assignee server or on the assignee server, the value added process requests the web page containing the logo or trademark directly from whatever server upon which it is stored.

Step 138 represents the process carried out by the value added process of modifying the data to be displayed so as to call attention to the branded sender emails, white list emails and fraudulent emails in different ways. Any what this can be done will suffice. One way is for the value added process to use hooks installed in the operating system rendering process or the rendering process of the email client to redirect function calls and arguments directed to the operating system rendering process to a rendering process in the value added process. The rendering process of the value added process alters the function calls and/or the arguments supplied to the operating system rendering process so as to cause a display in accordance with this class of embodiments. In alternative embodiments, the display generated by the email client can be used as is and commands sent to a vibration generation apparatus or a scent generating apparatus to call attention to the white list, branded sender and fraudulent emails in different ways. In the preferred embodiment, branded sender logos are displayed in the sender column and the logos uploaded by the white list senders (or generic white list logos if a white list sender has not uploaded a logo) are displayed to the left of the sender column or to the right of the sender column and to the left of the subject line. Fraudulent email logos are displayed to the left of the sender column.

Branded Mouseover Event

Figure 11:
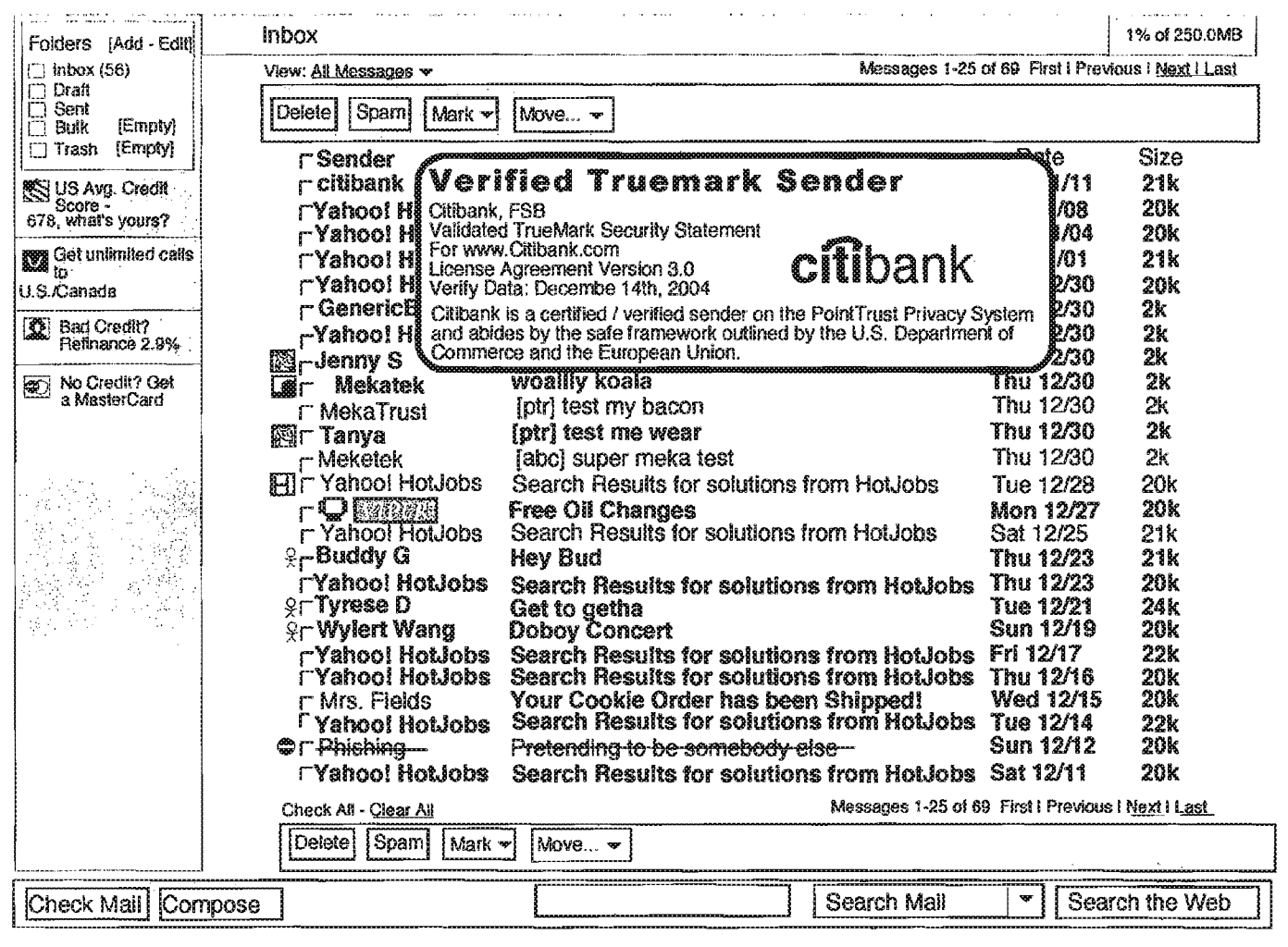

FIG. 11 is a screenshot of one embodiment of a user interface display that occurs when an event called the branded mouseover occurs. A branded mouseover event occurs when a user passes his or her mouse over an email from a branded sender which is displayed in the chosen list view such as the inbox with an associated graphic. The idea is to display a pop up box which has more information about the branded sender. In the example shown in FIG. 11, a pop up box giving more information about branded sender Citibank is displayed. This pop up box displays information about Citibank such as that Citibank is a Verified Truemark Sender, their logo, the license agreement version between the assignee and Citibank, the verify date when the assignee performed the due diligence checks to make sure Citibank had the right to display the logo and the person who signed the license agreement with the assignee had the authority to bind the company and a certification that Citibank is a certified/verified sender of the and abides by the same framework outlined by the U.S. Department of Commerce and the European Union. In the preferred embodiment, this pop up box appear each time the mouse passes over a branded sender email where the send has an associated graphic. In other embodiments, a menu choice to turn this feature on or off is presented since the constant popping up of pop up boxes might annoy the user if the user knows that the email would not appear in the inbox and set off as being from a branded sender unless it had been verified as being from a branded sender.

The process to implement branded mouseover has the value added process monitoring events published by the operating system as to the position of the mouse and comparing the position to the positions of displays of the various emails. When the mouse is over a position occupied by a branded email, the value added process retrieves the pop up block image for that branded sender either from local storage or the assignee server and sends commands to the operating system rendering process API to display the pop up box.

In some embodiments, branded sender emails are put into a user's inbox display without checking their authenticity, and the user causes such an authenticity check to be performed by doing a mouse over. When the user places her mouse over a branded email, the value added process detects this fact and sends an inquiry to the assignee server and passing to it the identity of the sender of the branded email. The assignee server then looks up the status of the sender of the allegedly branded email, and if the sender is a branded email sender, the assignee server sends back verification of this fact along with the data for the pop up box shown in FIG. 11. The value added process then makes appropriate calls to the OS rendering process API to render the pop up box over the current list display.

White List Mouseover Display

Figure 12:
FIG. 12 is a screen shot showing one embodiment of a buddy mouseover popup display which occurs when a user passes the mouse cursor over a white list email currently being displayed.

FIG. 12 is a screen shot showing a layered buddy mouseover pop-up display which occurs when a user passes the mouse cursor over a white list email currently being displayed. In embodiments where white list emails do not get to the point of being displayed in a list view until they have been authenticated, the white list mouseover process works as follows. When the user passes the mouse cursor over a email sent from somebody on the white list, the value added process detects this event and determines which white list sender's email currently has the cursor located over it. It then looks up the data for a pop-up box, and makes appropriate function calls to the OS rendering system API to display the popup box for that particular white list sender. Typical data displayed are the gender and birthday of the buddy (white list senders may not all be buddies—some may be clients or business associates), the location and occupation of the buddy, the interests, favorite party drinks, songs or song genres the buddy likes, the favorite restaurants or local hang outs the buddy favors and what person or thing the buddy is a secret fan of, links to blogs, photo album links, instant messenger status, etc.

In some embodiments, where all emails get displayed before they are authenticated, the buddy mouseover process works as follows. When the mouse cursor is placed over an email from a white list sender, the value added process detects this event and compares the cursor location to the locations of display of the emails currently being displayed so as to determine which email has the mouse cursor located over it. The value added process then fetches the header data for this email and determines the identity of the sender either from the sender's email address or from member number metadata received from the assignee server. The identity of the sender along with other information needed to authenticate the email such as a reconstructed digital signature is then sent to the assignee sewer with a request to authenticate the email to make sure it is actually from the white list sender it purports to be from. The assignee server then authenticates the email in any way, typically by comparing the reconstructed digital signature to the original digital signature created when the email was sent. If the email appears to be authentic, the assignee server sends back the data needed for the popup box. The value added process then renders the popup box using the data received from the assignee server.

Affinity Display

In some embodiments, it is useful to have a visual cue on the display of emails which gives an immediate indication to the user regarding the strength of the relationship with a particular email sender. FIG. 2 shows one species of this subclass of embodiments with an affinity display shown at 150 as a grouping of stars or asterisks. Any symbol could be used. The idea is that the number of symbols in the group is an indication of the strength of the relationship with that sender. The visual indicator could also be a distinctive color with several different colors being used to represent several different levels of strength of relationship.

In the embodiments represented by FIG. 2, the number of stars present at 150 is based upon the number of email interactions had with the sender. The number of email interactions is stored and retrieved from a server which can be the same server used to store sender information (use assignee server). In other embodiments, the recipient may enter data in a configuration file in the assignee server which manually establishes the strength of the relationship with each member of the recipient's white list.

Embodiments Using Third Party Authentication Services

Figure 13:
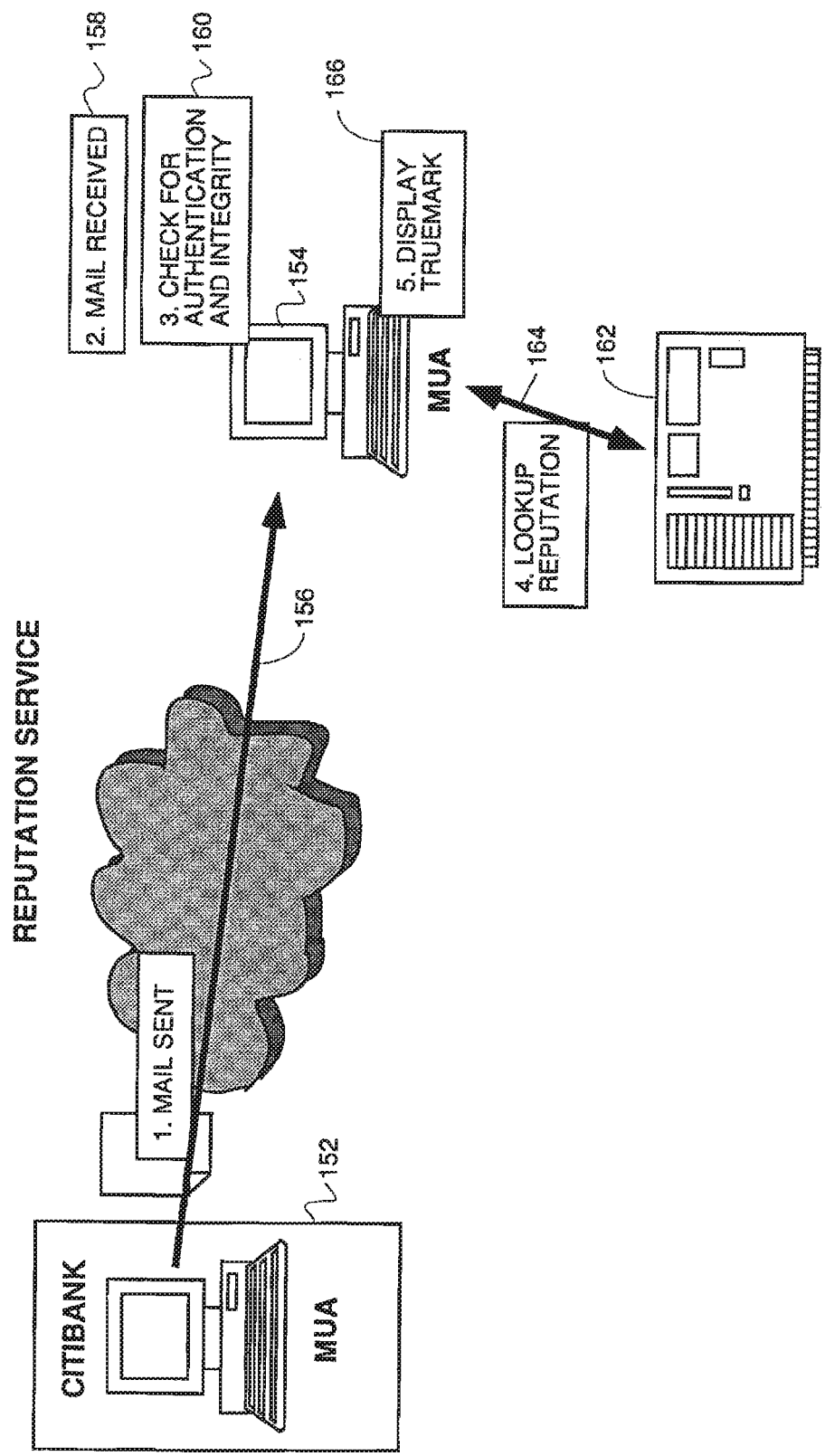
FIG. 13 is an a process flow diagram showing the preferred class of processes regarding how emails are authenticated and categorized and displayed with Truemark branding.

Referring to FIG. 13, there is shown an overview process flow diagram showing one class of embodiments of how emails are authenticated and categorized and displayed with Truemark pay-for-play branding or white list icons or fraud icons. Block 152 represents a browser process or email client process running on a computer at a branded sender such as Citibank. A user composes an email addressed to the user of computer 154. This mail is sent by regular channels, as symbolized by line 156 and is routed to the recipient computer 154 which receives it either by using a browser process or an email client in the manner described previously, a process represented by block 158.

Block 160 represents a process of checking the received email for domain authenticity and integrity. No logo display by the value added process nor any other process by the value added process running in recipient computer 154 will be carried out to call attention to an email in a particular category until the email has been authenticated.

In carrying out this authentication process, any known process to check to verify the domain the email came from is the domain the email purports to have come from will suffice, and that is the meaning of domain authenticity. Further, any known process to check the integrity of the email to ensure it has not been tampered with will suffice, and that is the meaning of integrity. One example of how both domain authenticity and integrity can be checked is through use of any implementation that complies with the Domain Keys specification patented by Yahoo. Other examples of technologies that can be used to check domain authenticity and/or integrity are: the techniques available from Message Level, Inc. (special token created on a server when an email sent and with email received, the token is retrieved, its presence indicating the email is valid; those technologies taught in U.S. patent application entitled METHOD AND APPARATUS FOR IMPLEMENTING A MICROPAYMENT SYSTEM TO CONTROL E-MAIL SPAM, filed Feb. 12, 2004 and having Ser. No. 10/778,956, which is hereby incorporated by reference; SPFiSender ID (a technology AOL tried to implement involving publishing an anti-spam policy about who can send mail on behalf of the company usually listing a specific IP address or range of addresses, and the receiver of the mail verifies the sender using the policy); S/MIME (email is encapsulated in an envelope, and the contents of the envelope is encrypted with a private key of a public key-private key pair—the sender's public key is used to decrypt the envelope contents) and cryptographic techniques (the message is encrypted with the private key of the sender, and the recipient looks up the public key of the sender and uses it to decrypt the message).

After the domain authenticity and integrity of the message have been checked, a value added process cooperating with a web browser process or email client process executing in computer 154 obtains the information in the sender field of the header of each email and sends that information to a server run by the assignee, represented by block 162. The process of sending the sender field contents to server 162 with a request to look up the "reputation" of the sender is represented by line 164. The reputation of the sender is at least what category is the sender in: branded; white list; fraudulent; or other. In some embodiments, another category is present which is a person who is a subscriber to the assignee's services but who is not on a white list of the recipient, not fraudulent and not a branded sender. The assignee server 162 uses the sender's identification information to look up the category of the sender and sends back that information to client computer 154.

Finally, the client computer value added process uses that reputation information and the information developed during the domain authenticity and integrity check to change the function calls and arguments made by the email client process or the web browser process to the operating system of computer 154 to cause any of the displays or other methods described above of calling attention to emails of different categories in different ways, as represented by block 166. If an email is authentic and from a branded sender, the preferred embodiment displays the Truemark of the sender in the sender column. The Truemarks and white list logos and fraud logos may be stored in computer 154 or fetched from assignee server 162 using location information supplied by server 162 with the reply to the reputation lookup request 164.

Figure 14:
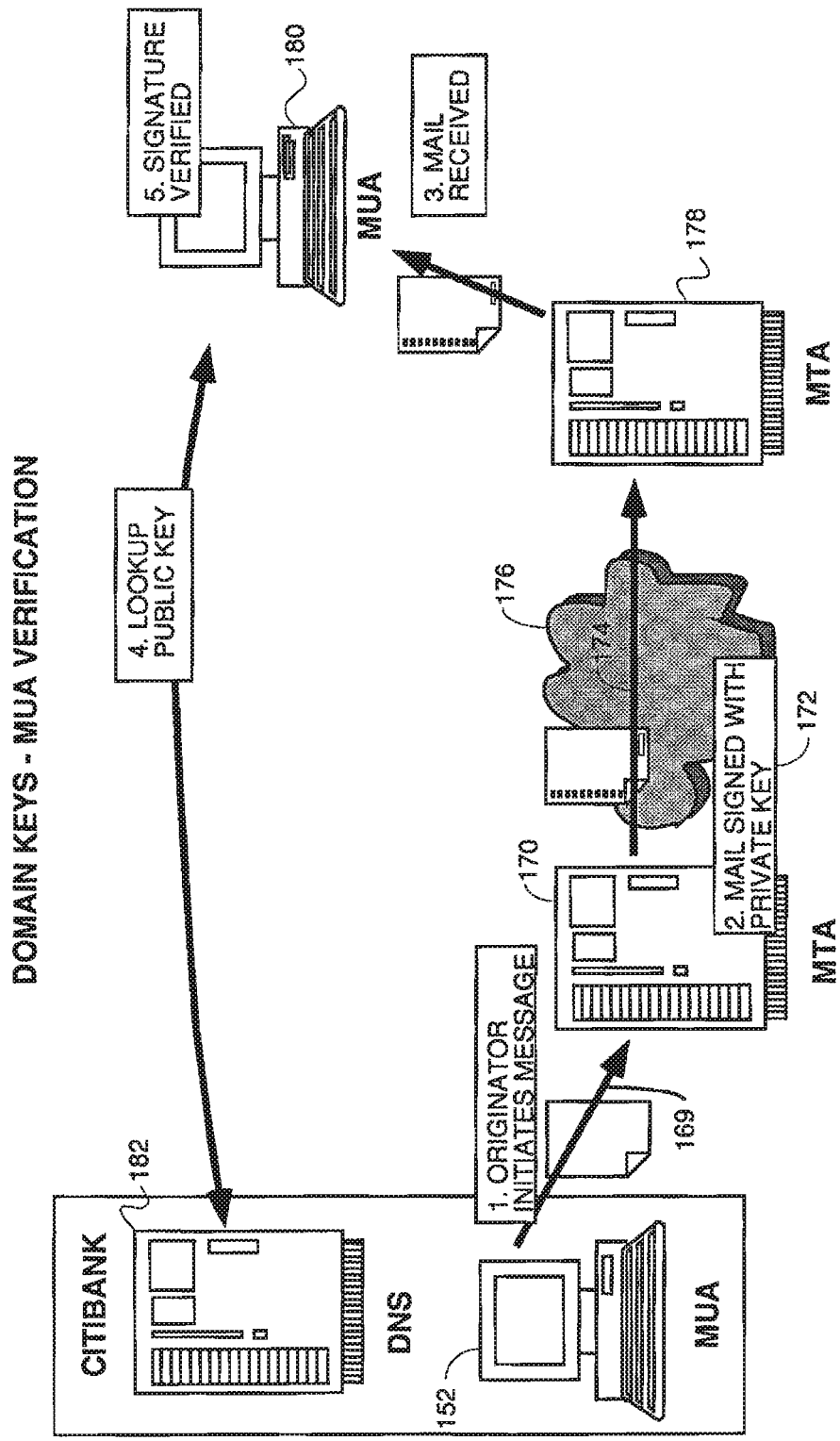
FIG. 14 is a protocol flow diagram of one embodiment of a process implemented by uniquely programmed computers to do the authentication and integrity checking embodiments.

FIG. 14 is a protocol flow diagram of one embodiment of a process implemented by uniquely programmed computers to do the authentication process mentioned above in the description of the protocol and flow of communications represented by FIG. 13. A client computer 152 on the network (or stand alone) originates an email and sends it (169) to the outgoing mail server 170 of the branded sender (if they have their own email servers) or of an ISP with whom the sender has an account in the case of either a branded sender or a white list sender. All branded senders will have to have a Domain Keys implementation running on their outgoing mail server 170 in order to digitally sign outgoing emails. The domain keys implementation can be anything, and free copies are available for download. All domain keys implementations must comply with the Domain Keys specification. The server 170 signs the mail with a private encryption key of MUA 152 from a private key, public key encryption key pair.

A digital signature is prepared (172) to protect the parts of the email to be protected from tampering using the private key of MUA 152. To compute the digital signature, the main body of the email, any attachments and anything else that needs to be protected from tampering (such as the header) is hashed. That hash value is then encrypted with the private key of the domain from which the email originated to generate a digital signature. That digital signature is then put into a special header in the email.

The digitally signed email is then sent (174) over the internet 176 and gets routed to the incoming mail server 178 of the recipient. The email which is sent has the body of the email and the header sent in the clear but includes the digital signature in the authentication header.

The incoming mail server 178 sends the email to the recipient's client computer 180 when an email client (not shown) process on client computer 180 requests download of the recipient's emails. Alternatively, server 178 is a web mail server and, when a web browser process (not shown) on the client computer 180 logs in and requests display of the recipient's emails, the server 178 sends data to client 180 which causes the client to display an email inbox and a list view of the emails that have not been previously downloaded. When the user clicks on an email, a request is sent to server 178 to send data that causes client computer 180 to display the contents of the email, and that data is then sent. A value added process running in the client computer then fetches the main body, header and digital signature of each signed email.

The client computer must then authenticate the email. To do this, the client computer 180 sends a request to a DNS server 182 of the sender. This request is for the public key of the sender. The DNS server replies by sending the public key back to the client computer. The client computer 180 then computes the same hash value from the same parts of the email and using the same hash algorithm that was used when the digital signature was originally prepared. The client computer then decrypts the digital signature from the email header with the public key to recover the original hash value and compares the two hash values. If the hash values match, the email has not been tampered with. If the hash values do not match, the client computer determines that the email has been tampered with.

Because the public key comes from the domain name server of the sender the email purports to be from, if the public key does not match the public key in the public-private key pair of the sender, then it means the email did not originate in that domain and is a spoof or otherwise fraudulent. Also, if the digital signature does not decrypt properly, the email has been tampered with.

The client computer then proceeds to a reputation lookup as previously described in connection with the discussion of FIG. 13.

Figure 15:
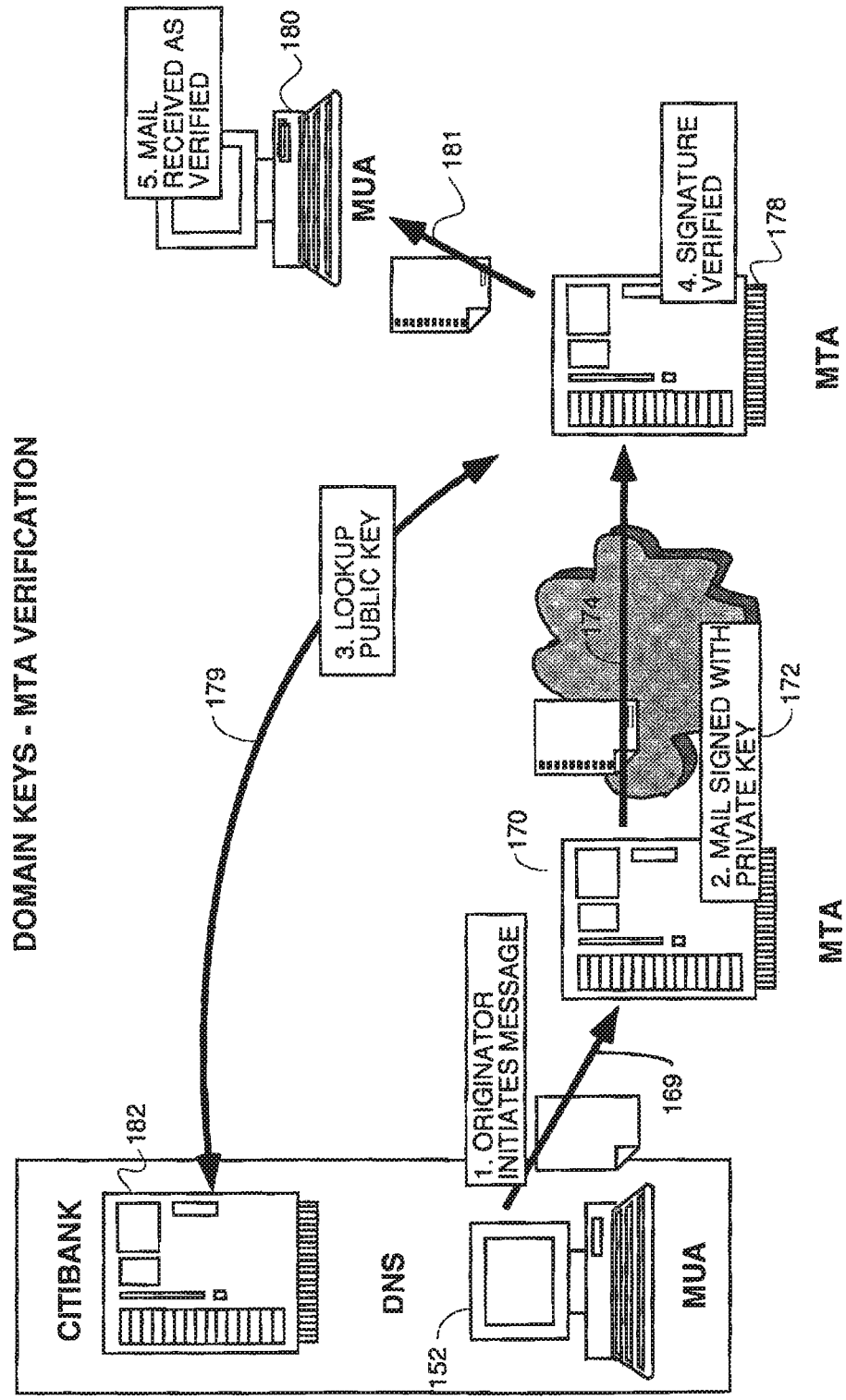
FIG. 15 is a flow diagram of another embodiment for doing authentication and integrity checking.

FIG. 15 is a flow diagram of another way of doing the authentication step. The embodiment represented by the process flow of FIG. 15 differs from the embodiment represented by the process flow of FIG. 14 in that the digital signature verification is done in server 178 instead of client computer 180. In some embodiments of this species, the web mail server 178 will not even display an email in a list of a recipient's emails unless the email has been authenticated. In other embodiments, the list of emails will be displayed to a web browser running on client computer 180 and the headers thereof can be fetched by the value added process running in computer 180, but until the email is authenticated, no data is added to its header indicating the mail is authenticated. Until such data is added to an email header, the value added process running in client computer 180 will treat it as outlaw email and will not display any Truemark or white list logo. In some species, the value added process will not display the email at all until some data is found in the authentication header indicating the email is or is not authentic. Appropriate action regarding checking the category status of the email is then taken to determine how to display it.

In the process of FIG. 15, the originator computer creates and sends the email to outgoing mail server 170 which signs it with a private key and sends it over the internet to an incoming mail server 178 (or web mail server). The email is sent with the body, header and any attachments in the clear with the digital signature in the authentication header.

To authenticate the email, the hash which was used to create the digital signature is re-created in the incoming mail server 178 in the same way as described with respect to the embodiment of FIG. 14 (the body and attachments are hashed using the same hash algorithm as was used to create the hash which was input to the digital signature process). To authenticate the email, the incoming mail server 178 then makes a request 179 to DNS server 182 in the domain of the sender for the public key that corresponds to the sender identity of the email received. The DNS server sends back the public key, and the server 178 then uses the public key to decrypt the digital signature in the email's authentication header to recover the original hash and compares the two hash values to verify integrity and domain authenticity. If the digital signature does not decrypt properly, there is a mismatch in the private-public key pair and the email probably did not originate from the domain of the domain name server 182. The email is then sent to the client computer 180 with information inserted in a new header called an authentication results, said information indicating whether the email passed authentication or not (181).

The client computer 180 has a value added plug in process running on it. This value added process fetches the header and authentication results header of each email. It then performs the reputation lookup process previously described for all emails which are authentic by sending the sender identity (contents of the sender field in the header) to a server operated by the assignee. Status information is then looked up by the assignee server, and sent back to the client computer value added process with a pointer to any Truemark logo or white list logo associated with any email in the branded sender or white list category. This lookup uses the sender identity to first determine if the sender is a branded sender. If not, then the recipient identity (which is also sent by the client computer 180 with the request) is used to look up the buddy list of this recipient and determine if the sender is on that buddy list. The value added process then uses this status information received back from the assignee server to control the client computer to call attention to the various categories of emails in any of the different predetermined ways previously discussed. In some embodiments, there is another category of sender which are not branded senders, not white list buddies, but they are members with subscriptions to the service provided by the assignee.

FIG. 16 is a table that shows what is displayed for each different authentication result for each different category in embodiments where there are five categories: Truemark customer with FUAP set to true; Truemark customer with FUAP set to false; white list buddy; non member buddy; and non member.

The first line in FIG. 16, shown at 200 indicates what will be displayed in a display such as that shown in FIG. 2 for three different authentication test results when the FUAP option is set to true. If an email originates from the Truemark customer's domain, and it passes the authentication tests described above, this case will be referred as the Truemark case. In the Truemark case, the Truemark logo or registered trademark of the customer will be displayed in the sender column 10 of FIG. 2. This logo or registered trademark will be displayed in the sender column if and only if the sender proves the right to use the mark to the assignee of the invention during the due diligence process carried out when each Truemark customer first subscribes to the protected email space service. If an email originates from a Truemark customer's domain, but this email does not pass the authentication test or the authentication test has not been performed, then the fraud icon 42 will be displayed in the sender column or next to the sender column with the identity of the sender grayed out with a strikethrough font displayed or the word "phishing" displayed in a grayed out, strikethrough font such as is shown at 42 in FIG. 2.

Line 202 of FIG. 16 indicates what will be displayed for various authentication results for a Truemark customer with its FUAP option set to false. If an email originates from the customer's domain and it passes the authentication test, the customer's Truemark will be displayed. If the email fails the authentication test or the authentication test has not been performed, then nothing will be displayed meaning the email will not be displayed at all in some embodiments or the email subject line will be displayed, but nothing will be displayed in the sender column for that email.

If the sender is a white list buddy, line 204 indicates that the sender's buddy icon or a generic white list icon will be displayed next to the sender column or in the sender column regardless if the email passes, fails or is not tested by the authentication process.

Line 206 signifies that if the sender is a non member buddy, the generic non buddy icon will be displayed next to or in the sender column for that email.

Finally, line 208 signifies that if an email is from a non member, nothing will be displayed (no special logos or other calling attention techniques employed) for this email and it will be displayed just like any regular email was displayed before this invention.

Figure 17:
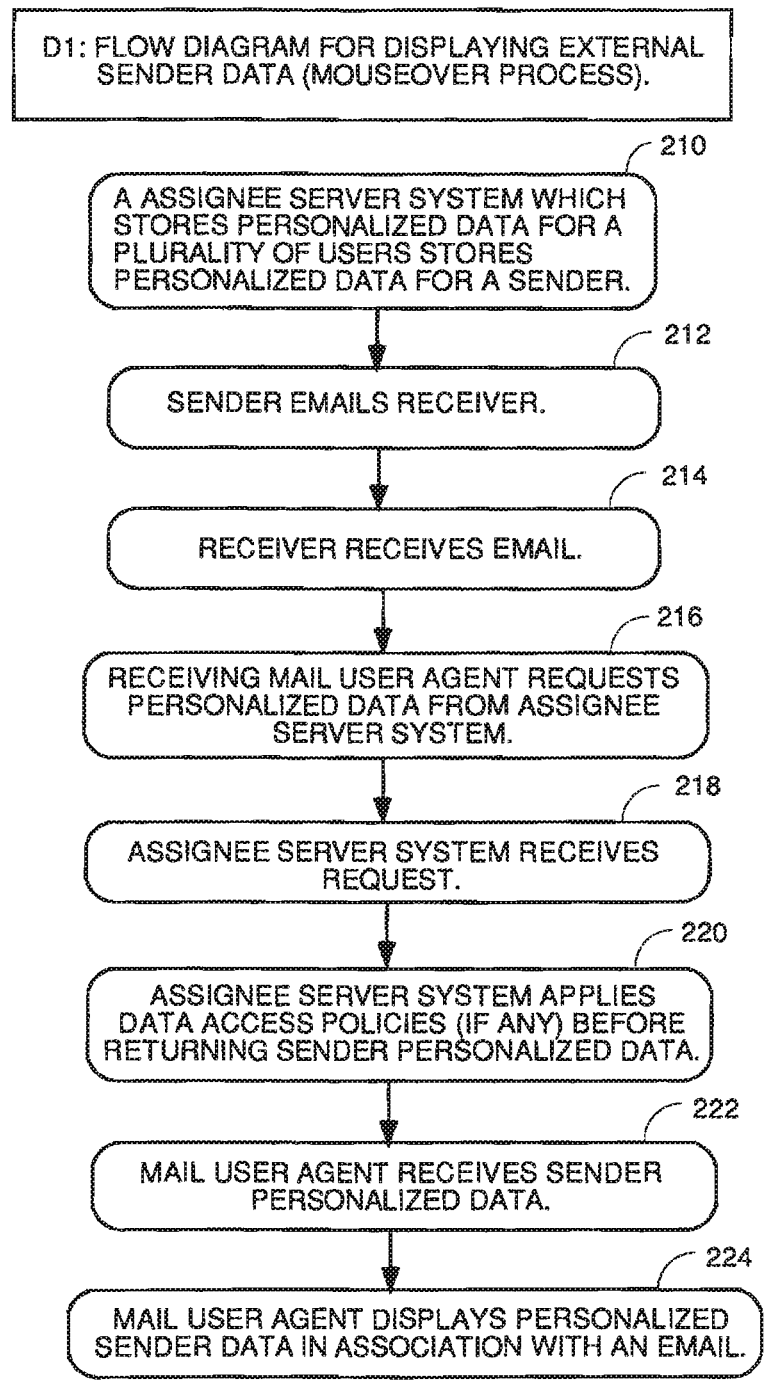
FIG. 17 is a flowchart showing the preferred process for displaying external sender data.

FIG. 17 is a flowchart of the preferred embodiment of a process for displaying external personalized sender data with a received email. Step 210 represents the process of the assignee server storing personalized data for a sender such as the data displayed in the mouse over example previously discussed. This happens when a member subscribes to the service so he or she can upload a buddy icon for storage in the assignee server. Step 212 represents the sender sending an email to a recipient. In step 214, the recipient receives the email. In step 216, the recipient's MUA client system requests from the assignee server the sender's personalized data. The assignee server receives the request and applies any relevant policies applying to data access in steps 218 and 220. The recipient's MUA system receives the sender's personalized data from the assignee server in step 222, and displays it in association with the sender's email in step 224. This can be, for example, by displaying the personalized sender data in a pop up window when the mouse is passed over the email from that sender displayed in the email list view.

Figure 18:
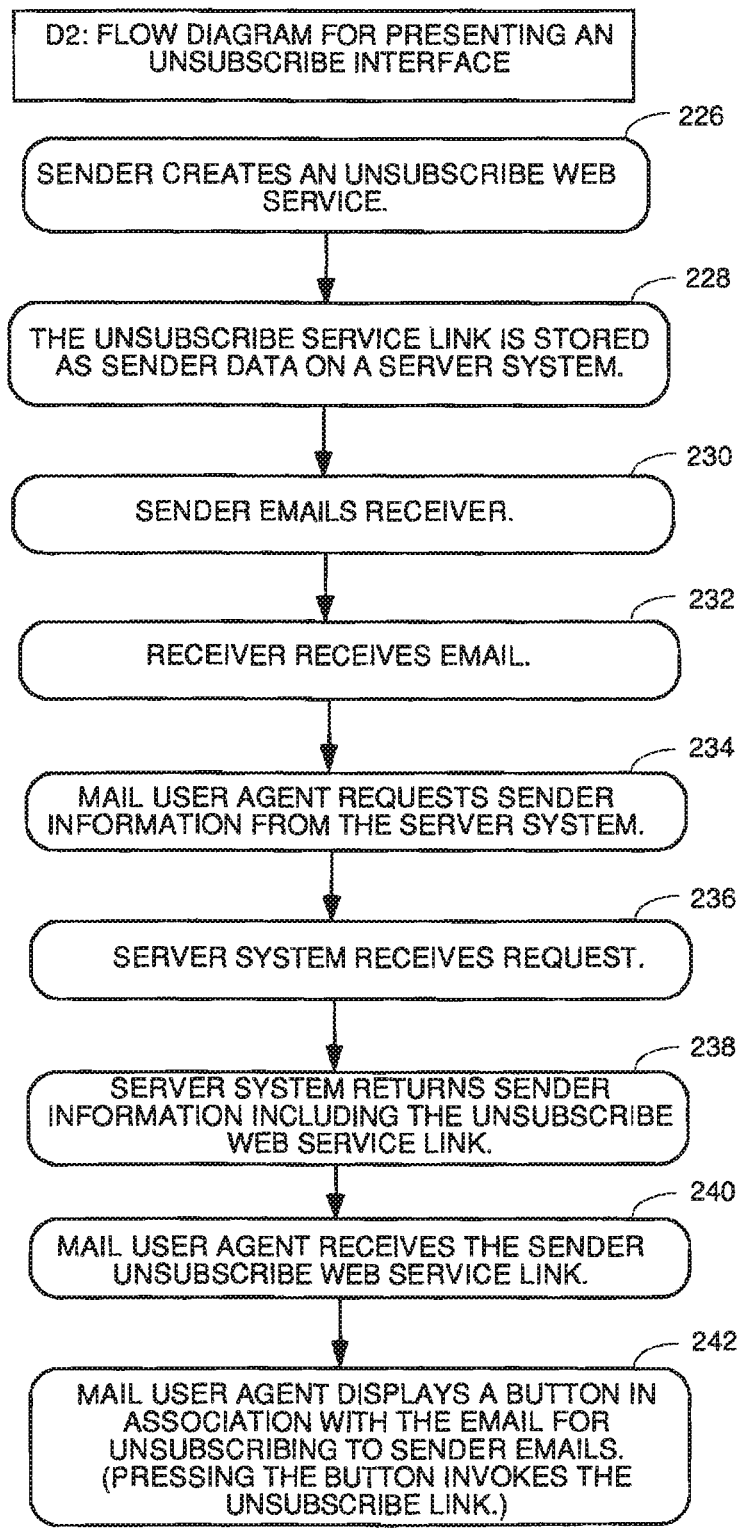
FIG. 18 is a flowchart of the preferred process of presenting an unsubscribe interface.

FIG. 18 is a flowchart of the preferred process of presenting an unsubscribe interface. This ability to unsubscribe is required by federal law. Step 226 represents the process of the sender creating an unsubscribe web service. In step 228, the unsubscribe service link is stored as sender data on the assignee server system. In step 230, the sender sends an email to a recipient, and in step 232, the recipient receives the email. In step 234, the client system requests the sender's data which was stored in step 228 from the assignee server. The assignee server receives this request in step 236 and returns the sender data in step 238. The returned data includes the unsubscribe web service link. In step 240, the recipient's MUA client system receives the sender unsubscribe link. In step 242, the client MUA displays a button in association with the email for unsubscribing to sender emails. If the recipient "presses the button", the unsubscribe link is invoked and the recipient is removed from the sender's email list.

Figure 19:
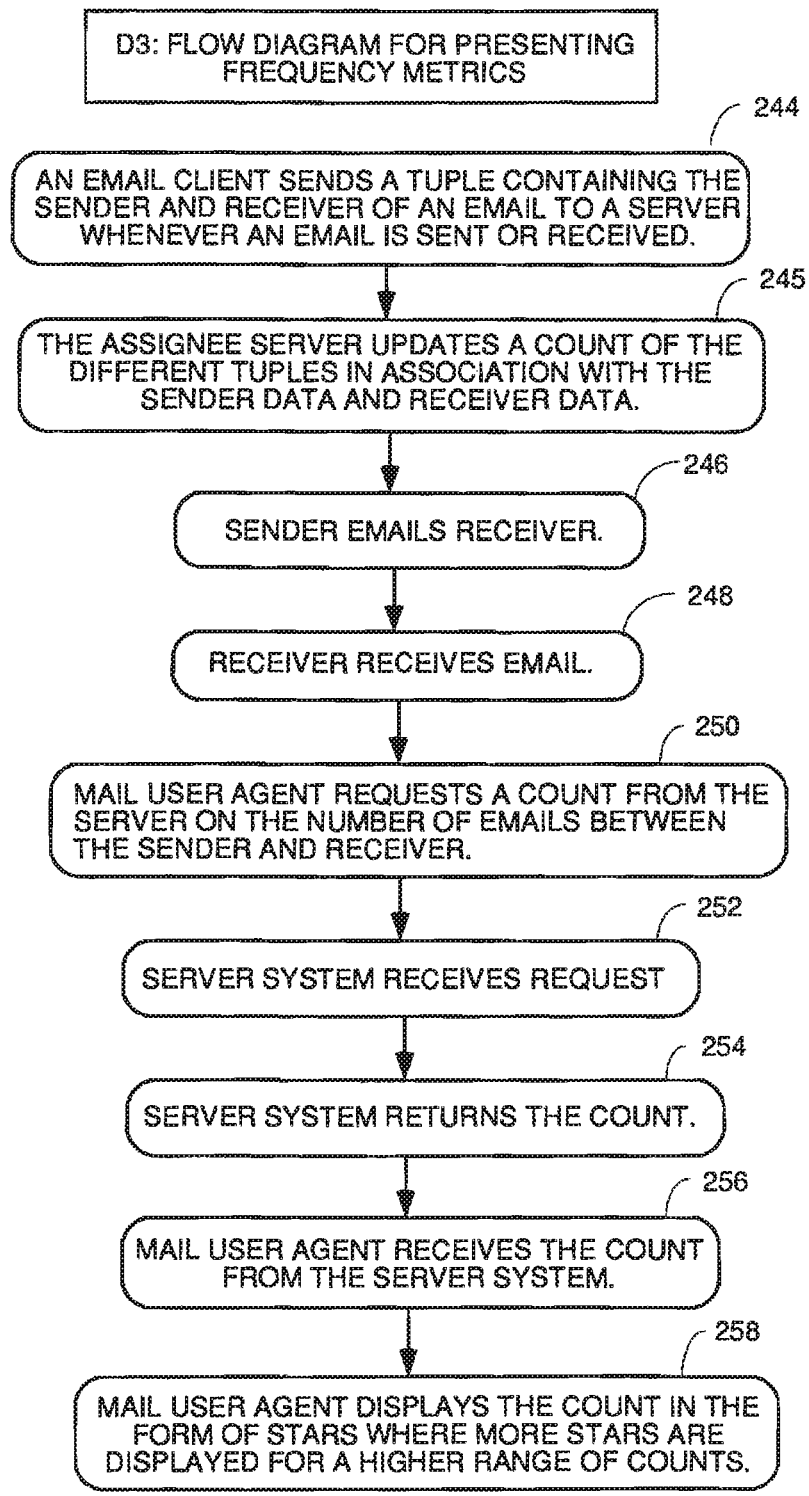
FIG. 19 is a flowchart of a process for presenting frequency metrics.

FIG. 19 is a flowchart of a process for presenting frequency metrics which are used by the recipient MUA to create distinctive displays for emails, said displays indicating the amount of communication that has historically been had with the sender of an email to which the frequency metrics apply. Step 244 represents the process of an email client sending a tuple contain the sender and receiver of an email to the assignee server whenever an email is sent or received. In step 245, the assignee server updates a count pertaining to the particular sender and receiver identified in the received tuple. Separate counts are maintained in the assignee server for each sender and recipient of which it has been informed. Step 246 represents the process of sending the email to the recipient from the sender MUA. In step 248, the recipient MUA receives the email. In step 250, the recipient MUA sends a message to the assignee server requesting a count of the number of emails that have been sent between the sender and receiver of the email just received. In step 252, the assignee server receives this request, and in step 254, the assignee server returns the requested count. In step 256, the client system receives the count data from the assignee server, and, in step 258, the client MUA process displays the email with a number of stars near the sender identification field, the number of stars being indicative of the number of emails that have passed between the sender and receiver historically. See FIG. 2 step 150 for an example display of a metric for frequency of communication.

Figure 20:
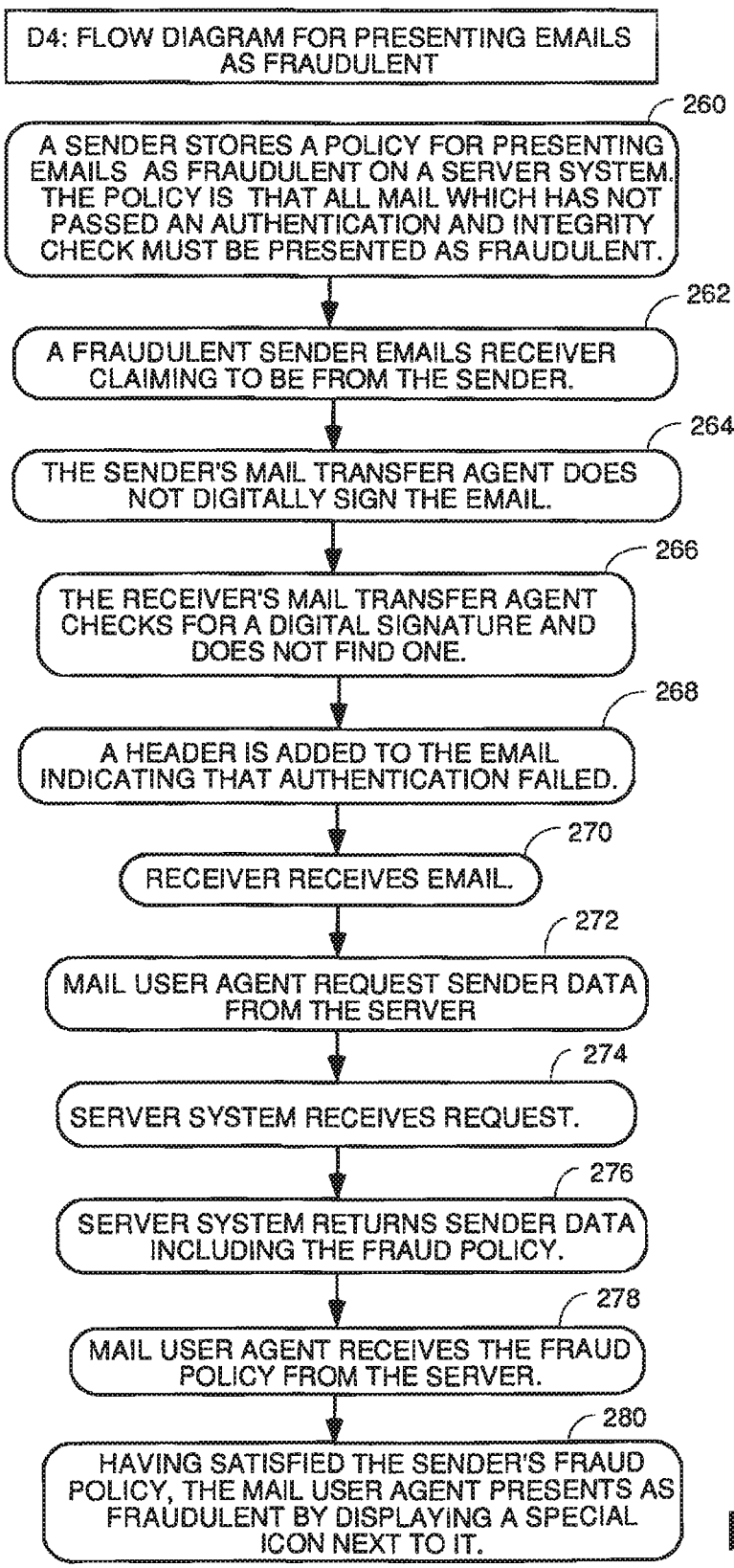
FIG. 20 is a flowchart of a process for detecting fraudulent emails and displaying them with a fraud indication.

FIG. 20 is a flowchart of the preferred embodiment process for detecting fraudulent emails and displaying them with a fraud indication. Step 260 represents the process of a legitimate sender storing a policy for detecting emails that are fraudulent on the assignee server. Such a policy typically is that all email which has not passed an authentication and integrity check must be presented as fraudulent. Step 262 represents the process of a phisher or other fraudulent sender (hereafter the phisher) sending an email claiming to be from the legitimate sender which established the policy in step 260. In such a case, the phisher's mail transfer agent process forwards the email but does not digitally sign the email, as represented by step 264. Step 266 represents the process of the recipient's mail transfer agent checking for a digital signature (which all legitimate emails from the legitimate sender will have) in the received email and not finding one. Step 268 represents the process of adding an authentication header to the email having data indicating that authentication failed. Step 270 represents the process of the receiver receiving the email that failed authentication. Step 272 represents the process of the recipient MUA client system making a request for sender data to the assignee server. In step 274, the assignee server system receives the request, and in 276, the assignee server returns the sender data including the fraud policy. In step 278, the client system receives the fraud policy sent from the assignee server. In step 280, the recipient MUA client system looks at the authentication header of the received email and notes it failed authentication. It then looks at the fraud policy of the sender and determines that the email should be displayed with a fraud indication next to it. The recipient MUA client computer then displays the email with a fraud logo next to the sender column or in any other way indicates the email is fraudulent.

Referring to FIG. 21, there is shown a flow diagram of a process carried out by a value added process to authenticate and integrity check incoming emails and display Truemarks. In step 282, a web browser launches and starts publishing events. In step 284, the value added process launches and starts monitoring events. The value added process detects an event indicating the web browser has been directed to a webmail page on which the user has an email account. In step 288, the user logs onto the webmail service, and the webmail server sends to the user's MUA a page displaying the user's inbox (or whatever other view the user requests such as sent, trash, etc.). In step 290, the user detects this event and fetches the header of each email displayed from the webmail server. The value added process then makes a web service call to retrieve the Truemark of the sender (if available) for each sender's email address in the inbox. This call is typically made to the assignee server, but the Truemarks may be stored elsewhere and the recipient MUA knows where they are stored from previous communications. For any emails for which the sender has a Truemark, an authentication check is made to ensure the email in fact came from that sender, and an integrity check is made to verify that the email has not been altered from its original state. For example, if the sender publishes a domain keys record, then a domain keys validation is performed in accordance with the domain keys specification. In step 296, the emails which have passed the authentication and integrity checks are determined from data in an authentication header added by the authentication and integrity checking process. In step 298, the recipient MUA client system request the fraud policy of the sender from the assignee server and receives it. Finally, in step 300, the fraud policy is examined and the authentication header of each email from the sender whose fraud policy was downloaded is examined. For those emails which passed the authentication and integrity checks and who satisfy the fraud policy, a Truemark is displayed.

Although the invention has been disclosed in terms of the preferred and alternative embodiments disclosed herein, those skilled in the art will appreciate that modifications and improvements may be made without departing from the scope of the invention. All such modifications are intended to be included within the scope of the claims appended hereto.

What is claimed is:

1. A method, comprising:
    monitoring communications between an email server and an email client;
    enhancing functionality of the email client based on authentication of senders of emails processed through the email server by adding distinctive visual indicators for the senders of the emails before the emails are presented within an inbox of the email client, wherein enhancing further includes adding first ones of the distinctive visual indicators as a strength of affinity between the senders of the emails and a recipient of the emails, wherein the first ones of the distinctive visual indicator comprise a grouping of symbols representing a total number of message interactions between the senders and the recipient.

2. The method of claim 1, wherein enhancing further includes integrating personalized data obtained for the senders into the distinctive visual indicators.

3. The method of claim 1, wherein enhancing further includes integrating results of authentication for the senders into the distinctive visual indicators.

4. The method of claim 1, wherein enhancing further includes adding first ones of the distinctive visual indicators as indications as to whether the emails where altered after being sent by the senders and before reaching the email client.

5. The method of claim 1, wherein enhancing further includes selectively activating the distinctive visual indicators based on events detected within the email client that are associated with viewing the emails.

6. The method of claim 5, wherein enhancing further includes activating first ones of the distinctive visual indicators for the emails when the emails are presented within an email list view for an inbox of the recipient of the emails on the email client.

7. The method of claim 6, wherein enhancing further includes activating second ones of the distinctive visual indicators for the emails when selective portions of the emails are brought into focus by the recipient of the emails on the email client.

8. The method of claim 7, wherein enhancing further includes activating third ones of the distinctive visual indicators for the emails when the emails are selected from the email list view of the inbox by the recipient of the emails on the email client.

9. The method of claim 1, wherein enhancing further includes adding first ones of the distinctive visual indicators as white list indicators for particular ones of the senders of the emails that are authorized by the recipient of the emails to send the emails to the recipient.

10. The method of claim 1, wherein enhancing further includes adding first ones of the distinctive visual indicators as graphic logos or photos associated with the senders of the emails.

11. A non-transitory computer-readable storage medium comprising executable instructions that when executed by a processor before a method comprising:
    obtaining a message sent from a sender and directed to a recipient; and
    customizing views associated with viewing with the message on the message client based on at least a sender identifier associated with the sender of the message, wherein customizing further includes adding a distinctive visual indicator as a strength of affinity between the sender of the message and the recipient of the message, wherein the distinctive visual indicator comprises a grouping of symbols representing a total number of message interactions between the sender and the recipient.

12. The medium of claim 11, wherein the executable instructions corresponding to the customizing further includes adding visual indicators to one or more of the views based on results associated with authenticating the sender.

13. The medium of claim 11, wherein the executable instructions corresponding to the customizing further includes adding visual indicators to one of more of the views based on results associated with authenticating a domain addresses associated with the message and the sender.

14. The medium of claim 11, wherein the executable instructions corresponding to the customizing further includes adding visual indicators to one or more of the views based on personal data associated with the sender.

15. The medium of claim 11, wherein the executable instructions corresponding to the customizing further includes selectively customizing the views based on events raised by the message client when the message is presented within a message list view, when selective portions of the message are brought into focus by the recipient, and when the message is selected from the message list view by the recipient.

16. The medium of claim 11, wherein the executable instructions corresponding to the customizing further includes adding visual indicators to the views that are not provided by the sender with the message and that are customized based on the sender identifier from the message client.

17. The medium of claim 11, wherein the executable instructions corresponding to the customizing further includes presenting a visual categorization indicator in at least one of the views associated with a custom category defined by the recipient for the sender identifier of the sender.

18. A device, comprising:
    a processor;
    a non-transitory computer-readable storage medium comprising executable instructions;
    the executable instructions when executed by the processor cause the processor to perform operations comprising:
    detecting a message being sent from a sender to a recipient associated with a message client; and
    altering views of and adding information to the views for the message within the message client based on at least a sender identifier for the sender, wherein altering further includes adding a distinctive visual indicator within at least one of the views as a strength of affinity between the sender of the message and the recipient of the message, wherein the distinctive visual indicator comprises a grouping of symbols representing a total number of message interactions between the sender and the recipient.

19. The device of claim 18, wherein the executable instructions when executed by the processor further cause the processor to perform additional operations comprising:
obtaining personal data associated with the sender identifier; and
customizing at least one of the views by adding at least a portion of the personal data to the at least one of the views.

* * * * *